US007113227B1

(12) United States Patent
Kakuya et al.

(10) Patent No.: US 7,113,227 B1
(45) Date of Patent: Sep. 26, 2006

(54) GRADATION CORRECTING APPARATUS GRADATION CORRECTING METHOD AND VIDEO DISPLAY APPARATUS

(75) Inventors: Yuki Kakuya, Osaka (JP); Atsuhisa Kageyama, Ibaraki (JP); Katsuya Ishikawa, Takatsuki (JP); Hidetoshi Suzuki, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1001 days.

(21) Appl. No.: 10/129,541

(22) PCT Filed: Nov. 24, 2000

(86) PCT No.: PCT/JP00/08275

§ 371 (c)(1),
(2), (4) Date: Jun. 14, 2002

(87) PCT Pub. No.: WO01/39495

PCT Pub. Date: May 31, 2001

(30) Foreign Application Priority Data

Nov. 25, 1999 (JP) .................................. 11-334163

(51) Int. Cl.
*H04N 5/14* (2006.01)
*H04N 5/20* (2006.01)
*H04N 5/52* (2006.01)
*H04N 9/64* (2006.01)
*H04N 9/69* (2006.01)
*H04N 9/77* (2006.01)
*G06K 9/00* (2006.01)
*G03F 3/08* (2006.01)

(52) U.S. Cl. .................. 348/678; 348/255; 348/679; 348/690; 348/708; 348/712; 382/167; 358/521

(58) Field of Classification Search ................ 348/678, 348/673, 675, 679, 690, 708, 712, 255, 256; 382/167; 358/521
See application file for complete search history.

(56) References Cited

U.S. PATENT DOCUMENTS

| 5,003,394 | A |   | 3/1991  | Lagoni ....................... 358/168 |
| 5,191,420 | A |   | 3/1993  | Lagoni et al. .............. 358/168 |
| 5,257,108 | A |   | 10/1993 | Muraoka ..................... 358/164 |
| 5,289,282 | A | * | 2/1994  | Tsuji et al. .................. 348/624 |
| 5,517,333 | A | * | 5/1996  | Tamura et al. .............. 358/518 |
| 5,680,230 | A | * | 10/1997 | Kaburagi et al. ........... 358/520 |

(Continued)

FOREIGN PATENT DOCUMENTS

EP 0 735 751 10/1996

(Continued)

*Primary Examiner*—Brian P. Yenke
(74) *Attorney, Agent, or Firm*—Steptoe & Johnson LLP

(57) ABSTRACT

The present invention has an object to provide a gradation correcting apparatus for correcting the gradation of the white side of a video luminance signal.

The gradation correcting apparatus is provided with a maximum value detector 101 for detecting a maximum value of a luminance signal S101, a white comparator 102 for comparing the luminance signal S101, a maximum luminance value S111 detected by the maximum value detector 101, and a first white threshold value S103, a white linear converter 103 for performing linear conversion on the luminance signal S101 on the basis of the maximum luminance value S111, the first white threshold value S103, and a second white threshold value S104, and a white controller 104 for correcting the luminance signal S101 on the basis of the result of the comparison in the white comparator 102, the output of the white linear converter 103, and the second white threshold value S104.

20 Claims, 22 Drawing Sheets

U.S. PATENT DOCUMENTS

| | | | |
|---|---|---|---|
| 5,742,410 A * | 4/1998 | Suzuki | 358/518 |
| 5,757,022 A | 5/1998 | Kobayashi et al. | |
| 5,852,677 A | 12/1998 | Nakamura et al. | |
| 6,704,446 B1 * | 3/2004 | Shigeta et al. | 382/168 |
| 6,919,924 B1 * | 7/2005 | Terashita | 348/223.1 |
| 7,013,042 B1 * | 3/2006 | Yamada et al. | 382/167 |
| 2002/0044691 A1 * | 4/2002 | Matsugu | 382/218 |
| 2002/0164085 A1 * | 11/2002 | Norimatsu | 382/275 |
| 2003/0161530 A1 * | 8/2003 | Yamada et al. | 382/167 |

FOREIGN PATENT DOCUMENTS

| | | |
|---|---|---|
| JP | 61-195670 | 12/1986 |
| JP | 5-167812 | 7/1993 |
| JP | 9-224153 | 8/1997 |
| JP | 10-248024 | 9/1998 |
| JP | 10-327348 | 12/1998 |

* cited by examiner

GRADATION CORRECTING APPARATUS GRADATION CORRECTING METHOD AND VIDEO DISPLAY APPARATUS

TECHNICAL FIELD

The present invention relates to a gradation correcting apparatus, a gradation correcting method, and a video display apparatus and, more particularly, the invention relates to a gradation correcting apparatus and method for correcting a luminance signal of an input video to an appropriate value according to a dynamic range of a display unit, and a video display unit having the gradation correcting apparatus.

BACKGROUND ART

A gradation correcting apparatus disclosed in Japanese Published Patent Application No. Hei. 1-300773 has been known as a conventional gradation correcting apparatus. This gradation correcting apparatus relates to a black level correcting apparatus, and employs a feedback system in which a black level in a scanning period is detected, a difference between the black level and a pedestal level is outputted and passed through a low-pass filter to perform gain adjustment, and the black level is controlled so as to be equal to the pedestal level.

However, use of the feedback system causes a problem that much time might be required until the feedback system is oscillated or stabilized. On the other hand, white correction, i.e., the white-side expanding operation, has not conventionally been carried out, while a prior art as described above has been proposed with respect to black correction, i.e., correction of the black level.

The present invention is made to solve the above-described problems and has for its objects to provided a gradation correcting apparatus and method for performing white correction or black correction with stability, without using a feedback system, and a video display apparatus having the gradation correcting apparatus.

DISCLOSURE OF THE INVENTION

According to claim 1 of the present invention, a gradation correcting apparatus comprises a maximum value detection means for detecting a maximum value of a luminance signal within a predetermined period of time, and outputting it as a maximum luminance value; a comparison means for comparing a first white threshold value, the maximum luminance value, and the luminance signal, and outputting a result of the comparison as a white comparison signal; a linear conversion means for receiving the first white threshold value, a second white threshold value, the maximum luminance value, and the luminance signal, and performing a predetermined linear conversion on the luminance signal to output a white linear-converted luminance signal; and a control means for selecting one from among the luminance signal, the second white threshold value, and the white linear-converted luminance signal, on the basis of the white comparison signal, and outputting it as a white corrected luminance signal; and the control means selects the luminance signal when the white comparison signal indicates that the luminance signal is equal to or smaller than the first white threshold value, selects the white linear-converted luminance signal when the white comparison signal indicates that the luminance signal is larger than the first white threshold value and equal to or smaller than the maximum luminance value, and selects the second white threshold value when the white comparison signal indicates that the luminance signal is larger than the first white threshold value and larger than the maximum luminance value.

According to the present invention, the gradation correcting apparatus is provided with the maximum value detection means for detecting the maximum luminance value, the comparison means for comparing the luminance signal, the first white threshold value, and the maximum luminance value, the linear conversion means for performing linear conversion on the luminance signal, and the control means for selecting one from among the luminance signal, the second white threshold value, and the white linear-converted luminance signal on the basis of a result of the comparison by the comparison means, and outputting it as a white corrected luminance signal. Therefore, stable correction of the gradation of the luminance signal can be carried out without using a feedback system and, furthermore, the most of the expressible white side can be expressed, whereby the dynamic range can be enlarged.

According to claim 2 of the present invention, the gradation correcting apparatus defined in claim 1 further comprises a threshold value change means for changing the first white threshold value on the basis of an average luminance level which is an average of levels of the luminance signal within a predetermined period of time, and outputting it as a changed white threshold value; wherein the comparison means and the linear conversion means employ the changed white threshold value instead of the first white threshold value.

According to the present invention, the gradation correcting apparatus is provided with the threshold value change means for changing the first white threshold value on the basis of the average luminance level, and outputting the changed white threshold value. Therefore, in addition to the same effects as those achieved by the gradation correcting apparatus of claim 1, the first white threshold value can be appropriately changed according to the status of the luminance signal over one field or several fields, and display can be carried out with the dynamic range being enlarged more appropriately according to the dynamic range of the display unit, and furthermore, the contrast of the video image constituted by the white corrected luminance signal can be enhanced.

According to claim 3 of the present invention, the gradation correcting apparatus defined in claim 1 further comprises a threshold value change means for changing the first white threshold value on the basis of the maximum luminance value, and outputting it as a changed white threshold value; and the comparison means and the linear conversion means employ the changed white threshold value instead of the first white threshold value.

According to the present invention, the gradation correcting apparatus is provided with the threshold value change means for changing the first white threshold value on the basis of the maximum luminance value, and outputting the changed white threshold value. Therefore, in addition to the same effects as those achieved by the gradation correcting apparatus of claim 1, display can be carried out with the dynamic range being appropriately enlarged by effectively using the information obtained from the input video signal, and furthermore, the contrast of the video image constituted by the white corrected luminance signal can be further enhanced.

According to claim 4 of the present invention, the gradation correcting apparatus defined in claim 1 further comprises a minimum value detection means for detecting a minimum value of the luminance signal within a predetermined period of time, and outputting it as a minimum luminance value; and a threshold value generation means for performing a predetermined arithmetic operation on the basis of the maximum luminance value and the minimum luminance value to generate a first white threshold value; and the comparison means and the linear-conversion means employ the first white threshold value generated by the threshold value generation means.

According to the present invention, the gradation correcting apparatus is provided with the minimum value detection means for detecting the minimum luminance value, and the threshold value generation means for generating the first white threshold value on the basis of the maximum luminance value and the minimum luminance value. Therefore, in addition to the same effects as those achieved by the gradation correcting apparatus of claim 1, an appropriate first white threshold value can be generated by effectively using the information obtained from the input video signal, and display can be carried out with the dynamic range being enlarged more appropriately according to the dynamic range of the display unit, and furthermore, the contrast of the video image constituted by the white corrected luminance signal can be further enhanced.

According to claim 5 of the present invention, the gradation correcting apparatus defined in claim 1 further comprises a maximum value change means for changing the maximum luminance value, and outputting it as a changed maximum luminance value; and the comparison means and the linear-conversion means employ the changed maximum luminance value instead of the maximum luminance value.

According to the present invention, the gradation correcting apparatus is provided with the maximum value change means for changing the maximum luminance value. Therefore, in addition to the same effects as those achieved by the gradation correcting apparatus of claim 1, the flexibility in performing gradation correction is increased, and display can be carried out with the dynamic range being enlarged more appropriately according to the dynamic range of the display unit.

According to claim 6 of the present invention, the gradation correcting apparatus defined in claim 1 further comprises a maximum value change means for changing the maximum luminance value on the basis of an average luminance level which is an average of levels of the luminance signal within a predetermined period of time, and outputting it as a changed maximum luminance value; and the comparison means and the linear-conversion means employ the changed maximum luminance value instead of the maximum luminance value.

According to the present invention, the gradation correcting apparatus is provided with the maximum value change means for changing the maximum luminance value on the basis of the average luminance level, and outputting the changed maximum luminance value. Therefore, in addition to the same effects as those achieved by the gradation correcting apparatus of claim 1, display can be carried out with the dynamic range being appropriately enlarged by effectively using the information obtained from the input video signal.

According to claim 7 of the present invention, the gradation correcting apparatus defined in claim 1 further comprises a minimum value detection means for detecting a minimum value of the luminance signal within a predetermined period of time, and outputting it as a minimum luminance value; and a threshold value change means for changing the second white threshold value on the basis of the minimum luminance value, and outputting it as a changed white threshold value; and the linear-conversion means and the control means employ the changed white threshold value instead of the second white threshold value.

According to the present invention, the gradation correcting apparatus is provided with the threshold value change means for changing the second white threshold value on the basis of the minimum luminance value. Therefore, in addition to the same effects as those achieved by the gradation correcting apparatus of claim 1, display can be carried out with the dynamic range being appropriately enlarged by effectively using the information obtained from the input video signal, and furthermore, the contrast of the video image constituted by the white corrected luminance signal can be further enhanced.

According to claim 8 of the present invention, the gradation correcting apparatus defined in claim 1 further comprises a microprocessor for changing the maximum luminance value, and outputting it as a changed maximum luminance value; and the comparison means and the linear conversion means employ the changed maximum luminance value instead of the maximum luminance value.

According to the present invention, the gradation correcting apparatus is provided with the microprocessor for changing the maximum luminance value to generate the changed maximum luminance value. Therefore, in addition to the same effects as those achieved by the gradation correcting apparatus of claim 5, the processing speed can be increased by performing the processing with the microprocessor. Further, since the gradation correcting apparatus is not required to have a circuit for performing arithmetic processing or the like, the circuit scale of the gradation correcting apparatus can be reduced.

According to claim 9 of the present invention, the gradation correcting apparatus defined in claim 1 further comprises a luminance change amount detection means for detecting the amount of change from the luminance value of the luminance signal to the luminance value of the white corrected luminance signal, and outputting it as a luminance change amount; and a color linking means for correcting color-difference signal on the basis of the luminance change amount.

According to the present invention, the gradation correcting apparatus is provided with the luminance change amount detection means for detecting the luminance change amount on the basis of the luminance signal and the white corrected luminance signal, and the color linking means for correcting the color-difference signal on the basis of the luminance change amount to output the corrected color-difference signal. Therefore, in addition to the same effects as those achieved by the gradation correcting apparatus of claim 1, the corrected color-difference signal, i.e., the color-difference signal which is corrected so as to be balanced with the luminance signal, can be obtained.

According to claim 10 of the present invention, a gradation correcting apparatus comprises a minimum value detection means for detecting a minimum value of a luminance signal within a predetermined period of time, and outputting it as a minimum luminance value; a comparison means for comparing a black threshold value, the minimum luminance value, and the luminance signal, and outputting a result of the comparison as a black comparison signal; a linear conversion means for receiving the black threshold value, a pedestal value, the minimum luminance value, and the luminance signal, and performing a predetermined linear conversion on the luminance signal to output a black linear-converted luminance signal; and a control means for selecting one from among the luminance signal, the pedestal value, and the black linear-converted luminance signal, and outputting it as a black corrected luminance signal; and the control means selects the luminance signal when the black comparison signal indicates that the luminance signal is equal to or larger than the black threshold value, selects the black linear-converted luminance signal when the black comparison signal indicates that the luminance signal is smaller than the black threshold value and equal to or larger than the minimum luminance value, and selects the pedestal value when the black comparison signal indicates that the luminance signal is smaller than the black threshold value and smaller than the minimum luminance value.

According to the present invention, the gradation correcting apparatus is provided with the minimum value detection means for detecting the minimum luminance value, the comparison means for comparing the luminance signal, the black threshold value, and the minimum luminance value, the linear conversion means for performing linear conversion on the luminance signal, and a control means for selecting one from among the luminance signal, the pedestal value, and the black linear-converted luminance signal on the basis of the result of the comparison by the comparison means, and outputting it as the black corrected luminance signal. Therefore, stable correction of the gradation of the luminance signal can be carried out without using a feedback system, and furthermore, the most of the expressible black side can be expressed, whereby the dynamic range can be enlarged.

According to claim 11 of the present invention, the gradation correcting apparatus defined in claim 10 further comprises a threshold value change means for changing the black threshold value on the basis of an average luminance level which is an average of levels of the luminance signal within a predetermined period of time, and outputting it as a changed black threshold value; and the comparison means and the linear conversion means employ the changed black threshold value instead of the black threshold value.

According to the present invention, the gradation correcting apparatus is provided with the threshold value change means for changing the black threshold value on the basis of the average luminance level to output the changed black threshold value. Therefore, in addition to the same effects as those achieved by the gradation correcting apparatus of claim 10, the black threshold value can be appropriately changed according to the status of the luminance signal over one field or several fields, and display can be carried out with the dynamic range being enlarged more appropriately according to the dynamic range of the display unit, and furthermore, the contrast of the video image constituted by the black corrected luminance signal can be further enhanced.

According to claim 12 of the present invention, the gradation correcting apparatus defined in claim 10 further comprises a threshold value change means for changing the black threshold value on the basis of the minimum luminance value, and outputting it as a changed black threshold value; and the comparison means and the linear conversion means employ the changed black threshold value instead of the black threshold value.

According to the present invention, the gradation correcting apparatus is provided with the threshold value change means for changing the black threshold value on the basis of the minimum luminance value, and outputting the changed black threshold value. Therefore, in addition to the same effects as those achieved by the gradation correcting apparatus of claim 10, display can be carried out with the dynamic range being appropriately enlarged by effectively using the information obtained from the input video signal, and furthermore, the contrast of the video image constituted by the black corrected luminance signal can be further enhanced.

According to claim 13 of the present invention, the gradation correcting apparatus defined in claim 10 further comprises a maximum value detection means for detecting a maximum value of the luminance signal within a predetermined period of time, and outputting it as a maximum luminance value; and a threshold value generation means for performing a predetermined arithmetic operation on the basis of the minimum luminance value and the maximum luminance value to generate a black threshold value; and the comparison means and the linear conversion means employ the black threshold value generated by the threshold value generation means.

According to the present invention, the gradation correcting apparatus is provided with the maximum value detection means for detecting the maximum luminance value, and the threshold value generation means for generating the black threshold value on the basis of the minimum luminance value and the maximum luminance value. Therefore, in addition to the same effects as those achieved by the gradation correcting apparatus of claim 10, an appropriate black threshold value can be generated by effectively using the information obtained from the input video signal, and display can be carried out with the dynamic range being enlarged more appropriately according to the dynamic range of the display unit, and furthermore, the contrast of the video image constituted by the black corrected luminance signal can be further enhanced.

According to claim 14 of the present invention, the gradation correcting apparatus defined in claim 10 further comprises a minimum value change means for changing the minimum luminance value, and outputting it as a changed minimum luminance value; and the comparison means and the linear conversion means employ the changed minimum luminance value instead of the minimum luminance value.

According to the present invention, the gradation correcting apparatus is provided with the minimum value change means for changing the minimum luminance value. Therefore, in addition to the same effects as those achieved by the gradation correcting apparatus of claim 10, the flexibility in performing gradation correction is increased, and display can be carried out with the dynamic range being enlarged more appropriately according to the dynamic range of the display unit.

According to claim 15 of the present invention, the gradation correcting apparatus defined in claim 10 further comprises a minimum value change means for changing the minimum luminance value on the basis of an average luminance level which is an average of levels of the luminance signal within a predetermined period of time, and outputting it as a changed minimum luminance value; and the comparison means and the linear conversion means employ the changed minimum luminance value instead of the minimum luminance value.

According to the present invention, the gradation correcting apparatus is provided with the minimum value change means for changing the minimum luminance value on the basis of the average luminance level, and outputting the changed minimum luminance value. Therefore, in addition to the same effects as those achieved by the gradation correcting apparatus of claim 10, display can be carried out with the dynamic range being appropriately enlarged by effectively using the information obtained from the input video signal.

According to claim 16 of the present invention, the gradation correcting apparatus defined in claim 10 further comprises a microprocessor for changing the minimum luminance value, and outputting it as a changed minimum luminance value; and the comparison means and the linear conversion means employ the changed minimum luminance value instead of the minimum luminance value.

According to the present invention, the gradation correcting apparatus is provided with the microprocessor for changing the minimum luminance value to generate the changed minimum luminance value. Therefore, in addition to the same effects as those achieved by the gradation correcting apparatus of claim 14, the processing speed can be increased by performing the processing with the microprocessor. Further, since the gradation correcting apparatus is not required to have a circuit for performing arithmetic processing or the like, the circuit scale of the gradation correcting apparatus can be reduced.

According to claim 17 of the present invention, a gradation correcting apparatus defined in claim 10 further comprises a luminance change amount detection means for detecting the amount of change from the luminance value of the luminance signal to the luminance value of the black corrected luminance signal, and outputting it as a luminance change value; and a color linking means for correcting color-difference signal on the basis of the luminance change amount.

According to the present invention, the gradation correcting apparatus is provided with the luminance change amount detection means for detecting the luminance change amount on the basis of the luminance signal and the black corrected luminance signal, and the color linking means for correcting the color-difference signal on the basis of the luminance change amount to output the corrected color-difference signal. Therefore, in addition to the same effects as those achieved by the gradation correcting apparatus of claim 10, the corrected color-difference signal can be obtained.

According to claim 18 of the present invention, a gradation correcting method comprises a maximum value detection step of detecting a maximum value of a luminance signal within a predetermined period of time; a linear conversion step of receiving the first white threshold value, a second white threshold value, the maximum luminance value, and the luminance signal, and performing a predetermined linear conversion on the luminance signal; a comparison step of comparing a maximum luminance value that is the maximum value detected in the maximum value detection step, the first white threshold value, and the luminance signal; and a selection step of selecting one from among a linear-converted luminance signal that is obtained by linear-converting the luminance signal in the linear conversion step, the luminance signal, and the second white threshold value, as a white corrected luminance signal, on the basis of a result of comparison in the comparison step; and, in the selection step, the luminance signal is selected when the result of comparison in the comparison step indicates that the luminance signal is equal to or smaller than the first white threshold value, the linear-converted luminance signal is selected when the result of comparison in the comparison step indicates that the luminance signal is larger than the first white threshold value and equal to or smaller than the maximum luminance value, and the second white threshold value is selected when the result of comparison in the comparison step indicates that the luminance signal is larger than the first white threshold value and larger than the maximum luminance value.

According to the present invention, the gradation correcting method is provided with the maximum value detection step of detecting the maximum luminance value, the comparison step of comparing the luminance signal, the first white threshold value, and the maximum luminance value, the linear conversion step of performing linear conversion on the luminance signal, and the selection step of selecting one from among the luminance signal, the second white threshold value, and the white linear-converted luminance signal on the basis of the result of the comparison in the comparison step. Therefore, stable correction of the gradation of the luminance signal can be carried out without using a feedback system, and furthermore, the most of the expressible white side can be expressed, whereby the dynamic range can be enlarged.

According to claim 19 of the present invention, a gradation correcting method comprises a minimum value detection step of detecting a maximum value of a luminance signal within a predetermined period of time; a linear conversion step of receiving a black threshold value, a pedestal value, the minimum luminance value, and the luminance value, and performing a predetermined linear conversion on the luminance signal; a comparison step of comparing the black threshold value, a minimum luminance value that is the minimum value detected in the minimum value detection step, and the luminance signal; and a selection step of selecting one from among a linear-converted luminance signal that is obtained by linear-converting the luminance signal in the linear conversion step, the luminance signal, and the pedestal value, as a black corrected luminance signal, on the basis of a result of comparison in the comparison step; and, in the selection step, the luminance signal is selected when the result of comparison in the comparison step indicates that the luminance signal is equal to or smaller than the black threshold value, the linear-converted luminance signal is selected when the result of comparison in the comparison step indicates that the luminance signal is smaller than the black threshold value and equal to or larger than the minimum luminance value, and the pedestal value is selected when the result of comparison in the comparison step indicates that the luminance signal is smaller than the black threshold value and smaller than the minimum luminance value.

According to the present invention, the gradation correcting method is provided with the minimum value detection step of detecting the minimum luminance value, the comparison step of comparing the luminance signal, the black threshold value, and the minimum luminance value, the linear conversion step of performing linear conversion on the luminance signal, and the selection step of selecting one from among the luminance signal, the pedestal value, and the black linear-converted luminance signal on the basis of the result of the comparison in the comparison step. Therefore, stable correction of the gradation of the luminance signal can be carried out without using a feedback system, and furthermore, the most of the expressible black side can be expressed, whereby the dynamic range can be enlarged.

According to claim 20 of the present invention, a video display apparatus is provided with a gradation correcting apparatus defined in any of claims 1 to 17.

According to the present invention, since the video display apparatus is provided with the gradation correcting apparatus for performing gradation correction of a luminance signal, a video image can be displayed with the dynamic range being enlarged more appropriately according to the dynamic range of the display unit.

BEST MODE FOR EXECUTING THE INVENTION

Embodiment 1

Hereinafter, a gradation correcting apparatus and a gradation correcting method according to a first embodiment of the present invention will be described with reference to the drawings.

Figure 1:
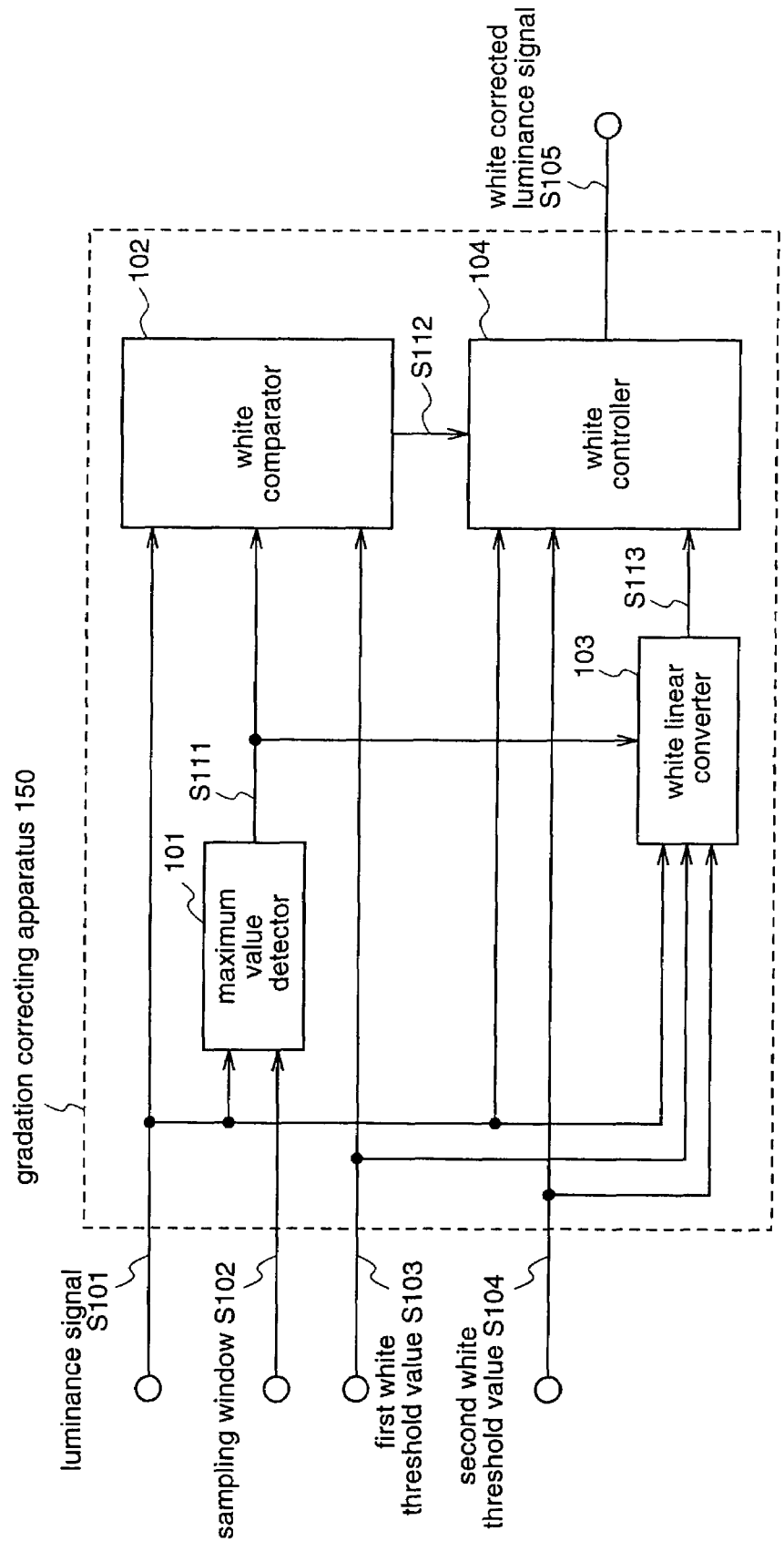
FIG. 1 is a block diagram illustrating the construction of a gradation correcting apparatus according to a first embodiment of the present invention.

FIG. 1 is a block diagram illustrating the construction of a gradation correcting apparatus according to the first embodiment.

In FIG. 1, a gradation correcting apparatus 150 is provided with a maximum value detector 101, a white comparator 102, a white linear converter 103, and a white controller 104.

The maximum value detector 101 receives a luminance signal S101 and a sampling window S102 indicating a sampling period, and outputs a maximum luminance value S111 which is a maximum value of luminance values within a predetermined period of time during which the luminance signal S101 is subjected to sampling.

The white comparator 102 receives the luminance signal S101, a first white threshold value S103 which is a start point when correcting the gradation of the luminance signal S101, and the maximum luminance value S111 which is outputted from the maximum value detector 101, and performs large/small evaluation on these signals, and outputs the result as a white comparison signal S112.

The white linear converter 103 receives the luminance signal S101, the first white threshold value S103 as a start point, a second white threshold value S104 as a peak value of the luminance signal S101, and the maximum luminance value S111 outputted from the maximum detector 101, and performs linear conversion on the luminance signal S101 according to conversion formula (1) which will be described later, and outputs a white linear-converted luminance signal S113 as the result of the linear conversion.

Assuming that the luminance signal S101 is X, the white linear-converted luminance signal S113 is Y, the first white threshold value S103 is WSTPO, the second white threshold value S104 is WPEAK, and the maximum luminance value S111 is MAX, conversion formula (1) is represented as follows.

$$Y = (WPEAK - WSTPO) \cdot (X - WSTPO)/(MAX - WSTPO) + WSTPO \quad \text{conversion formula (1)}$$

The white controller 104 receives the white comparison signal S112, the luminance signal S101, the second white threshold value S104, and the white linear-converted luminance signal S113, and selects one from among the luminance signal S101, the second white threshold value S104, and the white linear-converted luminance signal S113 on the basis of the white comparison signal S112, and outputs the selected signal as a white corrected luminance signal S105.

Next, a description will be given of the operation of the gradation correcting apparatus and the gradation correcting method according to the first embodiment.

Figure 2:
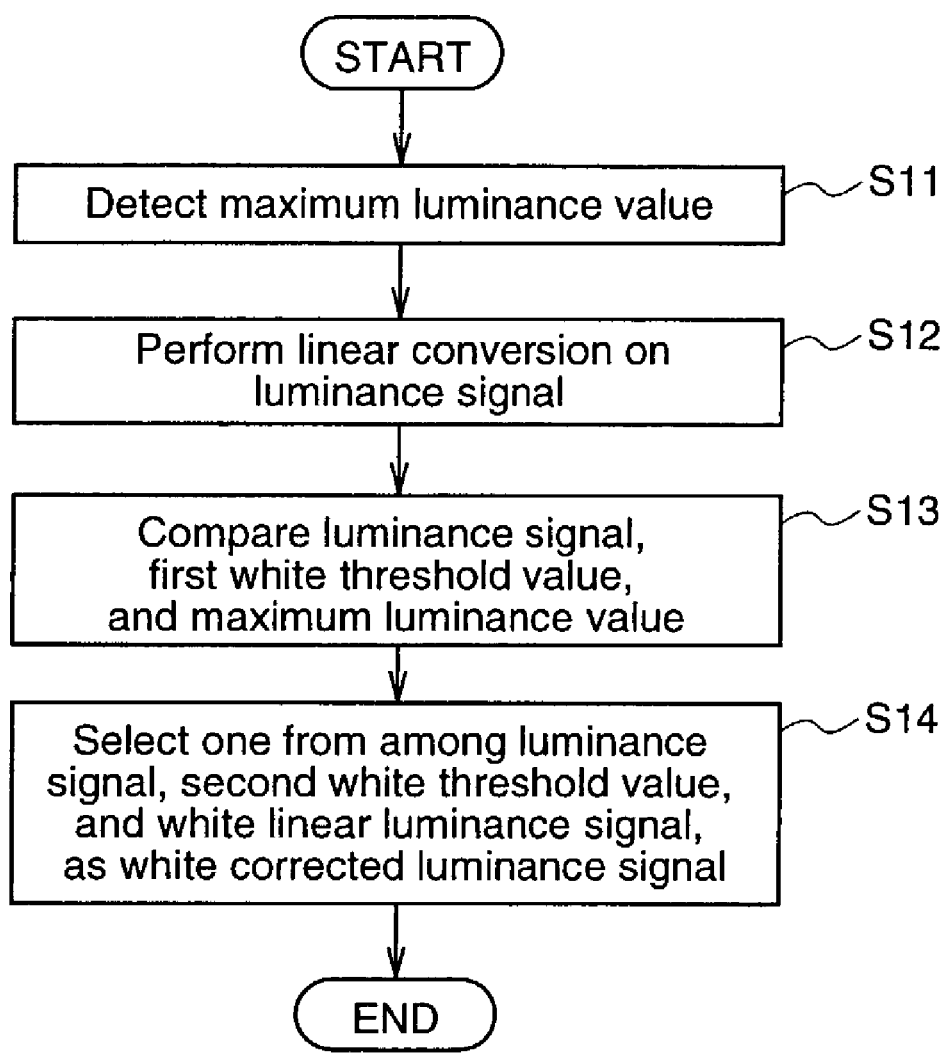
FIG. 2 is a flowchart illustrating the operation of the gradation correcting apparatus according to the first embodiment of the present invention.

FIG. 2 is a flowchart illustrating the operation of the gradation correcting apparatus 150 according to the first embodiment.

Initially, a luminance signal S101, which is a component of a video signal, is supplied to the gradation correcting apparatus 150.

The maximum value detector 101 detects a maximum luminance value S111 as a maximum value of the luminance signal S101, for every field, according to the sampling window S102, and outputs the maximum luminance signal S111 (step S111).

The white linear converter 103 subjects the luminance signal S101 to linear conversion on the basis of conversion formula (1), thereby obtaining a white linear-converted luminance signal S113 (step S12).

The white comparator 102 compares the luminance signal S101, the first white threshold value S103, and the maximum luminance value S111, and outputs a white comparison signal S112 as the comparison result to the white controller 104 (step S13).

the maximum luminance value S111, which is used for the comparison with the luminance signal S101 and the like in the white comparator 102 or for the linear conversion of the luminance signal S101 in the white linear converter 103, has been obtained in a field that is just previous to a field to which the luminance signal S101 used for the comparison or linear conversion belongs.

The white controller 104 selects a white corrected luminance signal S105 from among the luminance signal S101, the second white threshold value S104, and the white linear-converted luminance signal S113, on the basis of the white comparison signal S112, and outputs it (step S14).

More specifically, when the white comparison signal S112 indicates that the luminance signal S101 is equal to or smaller than the first white threshold value S103, the white controller 104 outputs the luminance signal S101 as a white corrected luminance signal S105, regardless of the value of the maximum luminance value S111. Further, when the white comparison signal S112 indicates that the luminance signal S101 is larger than the first white threshold value S103 and equal to or smaller than the maximum luminance signal S111, the white controller 104 outputs the white linear-converted luminance signal S113 outputted from the white linear converter 103 as a white corrected luminance signal S105. Furthermore, when the white comparison signal S112 indicates that the luminance signal S101 is larger than the first white threshold value S103 and larger than the maximum luminance value S111, the white controller 104 outputs the second white threshold value S104 as a white corrected luminance signal S105.

The first white threshold value S103 and the second white threshold value S104 are set so that the white corrected luminance signal S105 as the output from the gradation correcting apparatus 150 becomes an appropriate one, by the designer of the gradation correcting apparatus 150, with referring to an output video image displayed on a display unit (not shown). The first white threshold value S103 and the second white threshold value S104 are stored in a predetermined memory (not shown), and are read from the memory by the white linear converter 103 or the like.

By repeating the processes in steps from S11 to S14 of the flowchart shown in FIG. 2, white-side gradation correction is performed on the luminance signal S101.

The white corrected luminance signal S105 outputted from the gradation correcting apparatus 150 as well as color-difference signals are converted into RGB signals, whereby the gradation-corrected video image is displayed on the display unit (not shown).

Figure 3:
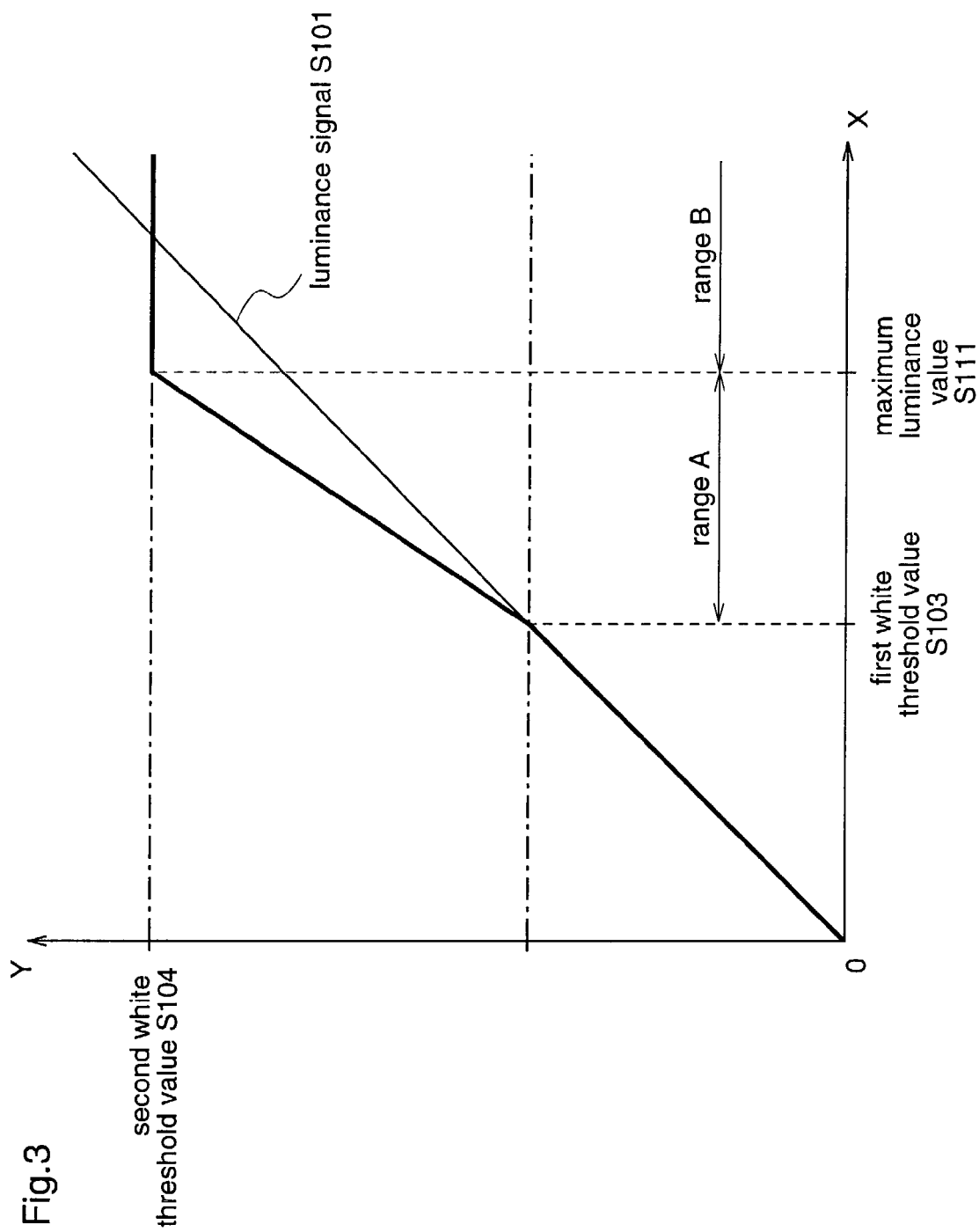
FIG. 3 is a diagram for explaining the operation of the gradation correcting apparatus according to the first embodiment of the present invention.

FIG. 3 is a diagram illustrating the relationship between the luminance signal S101 and the white corrected luminance signal S105.

When taking the luminance signal S101 on the X axis and the white corrected luminance signal S105 on the Y axis, the relationship between the luminance signal S101 and the white corrected luminance signal S105 becomes the graph shown in FIG. 3. It is premised that the maximum luminance signal S111 is larger than the first white threshold value S103.

As described above, when the luminance signal S101 is within a range A shown in FIG. 3, a white corrected luminance signal S105, which is obtained by linear-converting the luminance signal S101 into a straight line connecting the second white threshold value S104 as a white peak value and the first white threshold value S103, is outputted. Further, when the luminance signal S101 is within a range B shown in FIG. 3, the second white threshold value S104 as a white peak value is outputted as a white corrected luminance signal S105.

As described above, the gradation correcting apparatus according to the first embodiment is provided with the maximum value detector 101 for detecting the maximum luminance value S111; the white comparator 102 for comparing the luminance signal S101, the first white threshold value S103, and the maximum luminance value S111; the white linear converter 103 for performing linear conversion on the luminance signal S101; and the white controller 104 for selecting one from among the luminance signal S101, the second white threshold value S104, and the white linear-converted luminance signal S113, on the basis of the comparison result in the white comparator 102, and outputting it as the white corrected luminance signal S105. Therefore, stable correction of the gradation of the luminance signal S101 can be carried out without using a feedback system. Further, since the white peak is extended when the luminance signal S101 is within the range A shown in FIG. 3, the most of the expressible white side can be expressed, whereby the dynamic range can be enlarged.

While in this first embodiment the maximum value detector 101 detects the maximum luminance value S111 for every field, the present invention is not restricted thereto. For example, the maximum value detector 101 may detect the maximum luminance value S111 for every several fields or for every frame.

Furthermore, in the flowchart shown in FIG. 2 according to the first embodiment, the process in step S12 and the process in step S13 may be simultaneously performed irrespective of the order.

Embodiment 2

Hereinafter, a gradation correcting apparatus according to a second embodiment of the present invention will be described with reference to the drawings.

Figure 4:
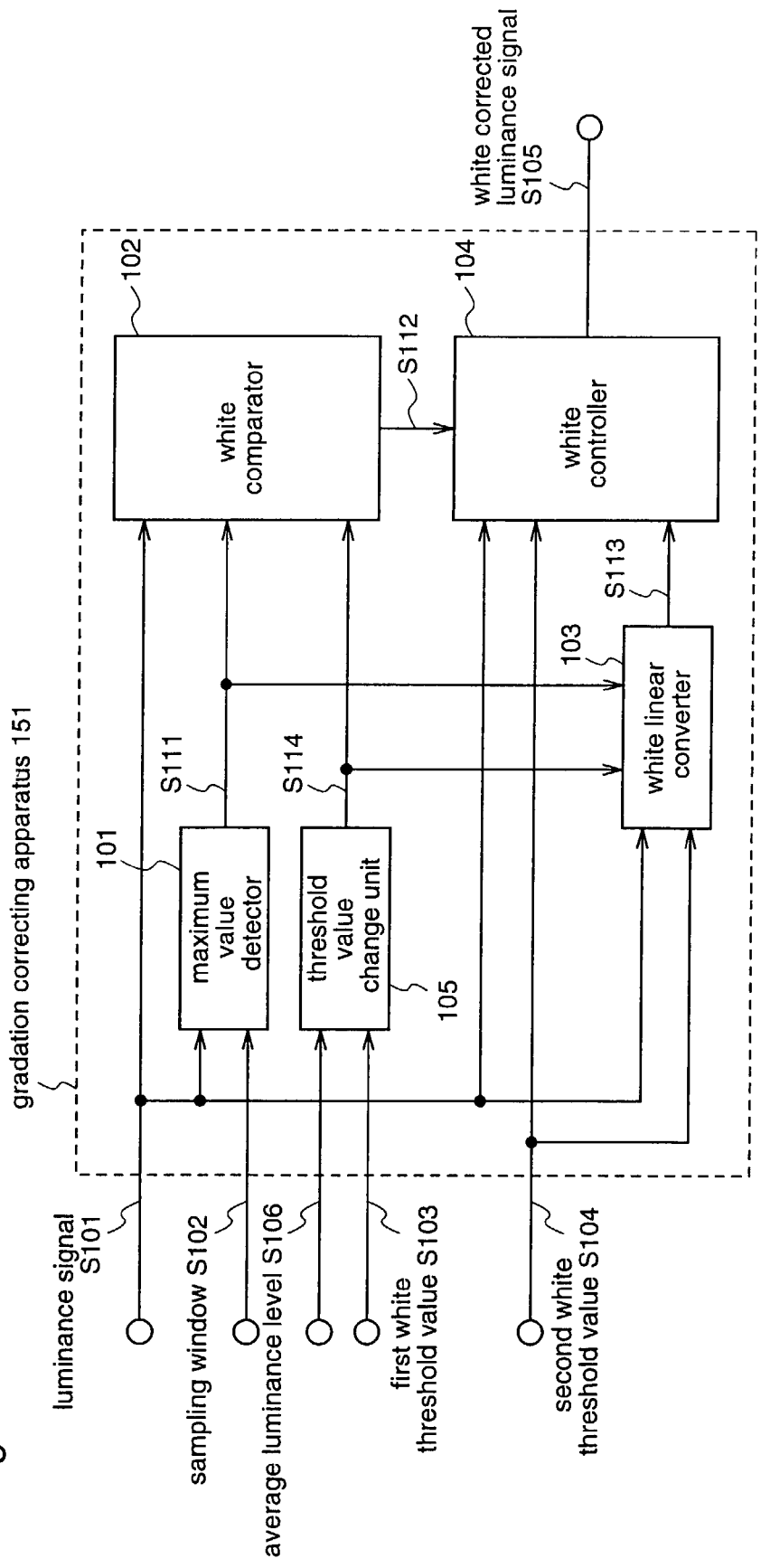
FIG. 4 is a block diagram illustrating the construction of a gradation correcting apparatus according to a second embodiment of the present invention.

FIG. 4 is a block diagram illustrating the construction of a gradation correcting apparatus according to the second embodiment.

With reference to FIG. 4, a gradation correcting apparatus 151 is provided with a maximum value detector 101, a white comparator 102, a white linear converter 103, a white controller 104, and a threshold change unit 105. The constructions and operations of parts other than part relating to the threshold value change unit 105 are identical to those of the gradation correcting apparatus 150 according to the first embodiment and, therefore, repeated description is not necessary.

The threshold value change unit 105 changes a first white threshold value S103 on the basis of an average luminance level S106 which is obtained by averaging luminance levels over a predetermined period of time, e.g., one field or several fields of a luminance signal S101, and outputs the first white threshold value S103 so changed, as a changed white threshold value S114.

Next, the operation of the gradation correcting apparatus according to the second embodiment will be described.

The threshold value change unit 105 receives the average luminance level S106 and the first white threshold value S103. Then, the threshold value change unit 105 changes the first white threshold value S103 so as to decrease it when the average luminance level S106 is smaller than a predetermined reference value, and changes the first white threshold value S103 so as to increase it when the average luminance level S106 is larger than the predetermined reference value. The threshold value change unit 105 outputs the value obtained by changing the first white threshold value S103, as a changed white threshold value S114, to the white comparator 102 and to the white linear converter 103. As for the reference value to be used for the large/small evaluation of the average luminance level S106 and the amount of change of the first white threshold value S103, appropriate values are selected by the designer.

In the white comparator 102 and the white linear converter 103, the changed white threshold value S114 is used in like manner as the first white threshold value S103 according to the first embodiment.

The operation of the gradation correcting apparatus 151 other than the threshold value change unit 105 is identical to that described for the first embodiment and, therefore, repeated description is not necessary.

As described above, the gradation correcting apparatus according to the second embodiment is provided with the threshold value change unit 105 for changing the first white threshold value S103 on the basis of the average luminance level S106, and outputting the changed white threshold value S114. Therefore, in addition to the effects achieved by the first embodiment, the first white threshold value S103 can be appropriately changed according to the condition of the luminance signal S101 over one field or several fields, and display can be carried out with the dynamic range being enlarged more appropriately according to the dynamic range of the display unit, and furthermore, the contrast of the video image constituted by the white corrected luminance signal S105 can be enhanced.

The amount of change by which the threshold value change unit 105 changes the first white threshold value S103 may be a default value that is determined by the designer, or it may be a variable value that is determined on the basis of a difference between a predetermined reference value and the average luminance level S106.

While in this second embodiment the threshold value change unit 105 compares the average luminance level S106 with a single reference value, the present invention is not restricted thereto, and there may be two or more reference values to be compared with the average luminance level S106. For example, the threshold value change unit 105 changes the first white threshold value so as to decrease it when the average luminance level S106 is smaller than a first reference value, does not change the first white threshold value S103 when the average luminance level S106 is between the first reference value and a second reference value that is larger than the first reference value, and changes the first white threshold value S103 so as to increase it when the average luminance level S106 is larger than the second reference value.

Embodiment 3

Hereinafter, a gradation correcting apparatus according to a third embodiment of the present invention will be described with reference to the drawings.

Figure 5:
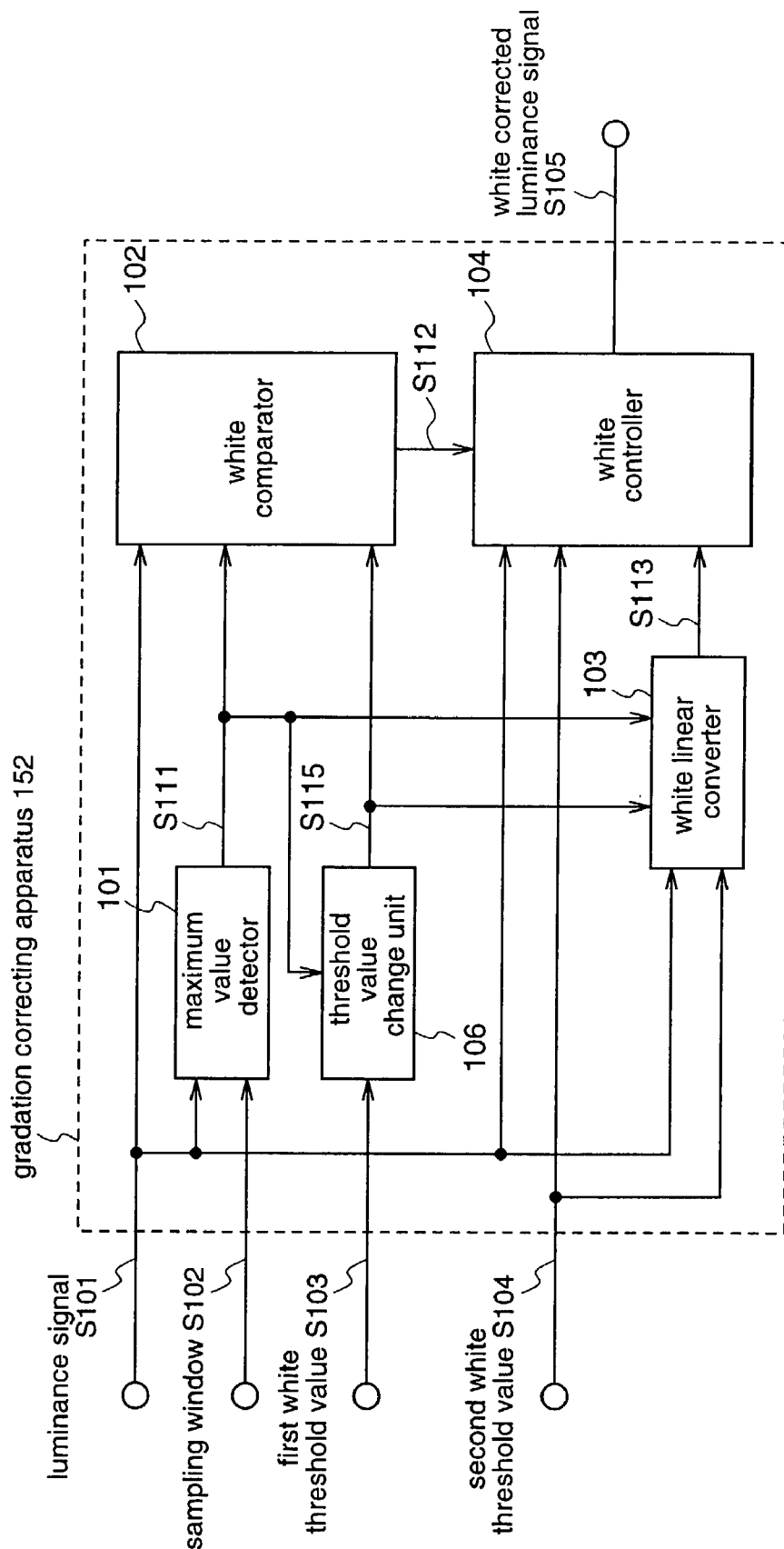
FIG. 5 is a block diagram illustrating the construction of a gradation correcting apparatus according to a third embodiment of the present invention.

FIG. 5 is a block diagram illustrating the construction of a gradation correcting apparatus according to the third embodiment.

With reference to FIG. 5, a gradation correcting apparatus 152 is provided with a maximum value detector 101, a white comparator 102, a white linear converter 103, a white controller 104, and a threshold value change unit 106. The constructions and operations of parts other than part relating to the threshold value change unit 106 are identical to those of the gradation correcting apparatus 150 according to the first embodiment and, therefore, repeated description is not necessary.

The threshold value change unit 106 changes a first white threshold value S103 on the basis of a maximum luminance value S111, and outputs the first white threshold value S103 so changed as a changed white threshold value S115.

Next, the operation of the gradation correcting apparatus according to the third embodiment will be described.

The threshold value change unit 106 receives the maximum luminance value S111 and the first white threshold value S103. Then, the threshold value change unit 106 changes the first white threshold value S103 so as to decrease it when the maximum luminance value S111 is smaller than a predetermined reference value, and changes the first white threshold value S103 so as to increase it when the maximum luminance value S111 is larger than the predetermined reference value. The threshold value change unit 106 generates a changed white threshold value S115, and outputs it to the white comparator 102 and to the white linear converter 103. As for the reference value to be used for the large/small evaluation of the maximum luminance value S111 and the amount of change of the first white threshold value S103, appropriate values are selected by the designer.

In the white comparator 102 and the white linear converter 103, the changed white threshold value S115 is used in like manner as the first white threshold value S103 according to the first embodiment.

The operation of the gradation correcting apparatus 152 other than the threshold value change unit 106 is identical to that described for the first embodiment and, therefore, repeated description is not necessary.

As described above, the gradation correcting apparatus according to the third embodiment is provided with the threshold value change unit 106 for changing the first white threshold value S103 on the basis of the average luminance level S106, and outputting the changed white threshold value S115. Therefore, in addition to the effects achieved by the first embodiment, display can be carried out with the dynamic range being appropriately enlarged, by effectively using the information obtained from the input video signal and, furthermore, the contrast of the video image constituted by the white corrected luminance signal S105 can be further enhanced.

The amount of change by which the first white threshold value S103 changes the threshold value change unit 106 may be a default value that is determined by the designer, or it may be a variable value that is determined on the basis of a difference between the predetermined reference value and the maximum luminance value S111.

While in this third embodiment the threshold value change unit 106 compares the maximum luminance value S111 with a single reference value, the present invention is not restricted thereto, and there may be two or more reference values to be compared with the maximum luminance value S111. For example, the threshold value change unit 106 changes the first white threshold value S103 so as to decrease it when the maximum luminance value S111 is smaller than a first reference value, does not change the first white threshold value S103 when the maximum luminance value S111 is between the first reference value and a second reference value that is larger than the first reference value, and changes the first white threshold value S103 so as to increase it when the maximum luminance value S111 is larger than the second reference value.

Embodiment 4

Hereinafter, a gradation correcting apparatus according to a fourth embodiment of the present invention will be described with reference to the drawings.

Figure 6:
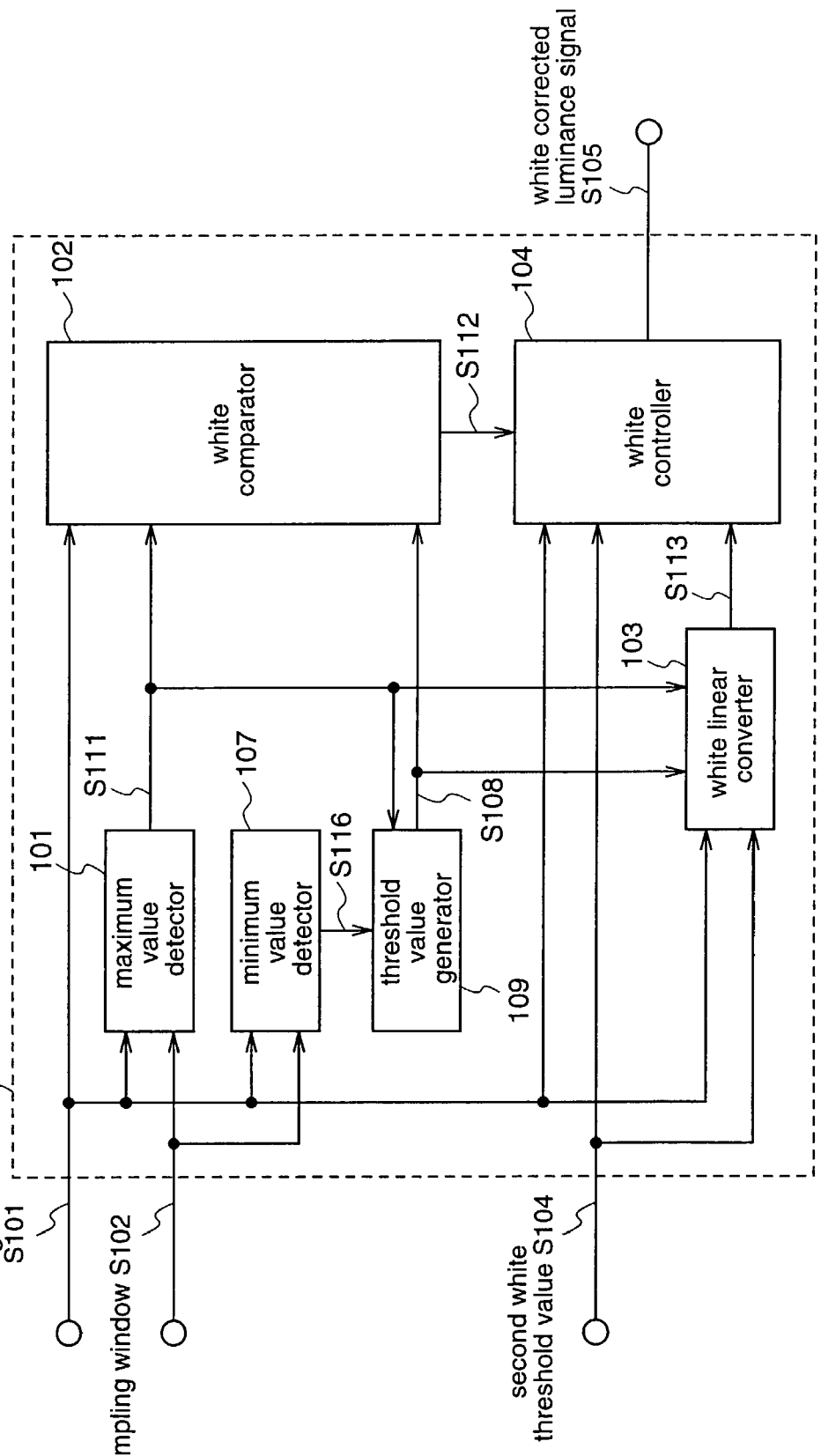
FIG. 6 is a block diagram illustrating the construction of a gradation correcting apparatus according to a fourth embodiment of the present invention.

FIG. 6 is a block diagram illustrating the construction of a gradation correcting apparatus according to the fourth embodiment.

With reference to FIG. 6, a gradation correcting apparatus 153 is provided with a maximum value detector 101, a white comparator 102, a white linear converter 103, a white controller 104, a minimum value detector 107, and a threshold value generator 109. The constructions and operations of parts other than parts relating to the minimum value detector 107 and the threshold value generator 109 are identical to those of the gradation correcting apparatus 150 according to the first embodiment, and therefore, repeated description is not necessary.

The minimum value detector 107 receives a luminance signal S101 and a sampling window S102 indicating a sampling period, and outputs a minimum luminance value S116 which is a minimum value of luminance values within a predetermined period of time during which the luminance signal S101 is subjected to sampling.

The threshold value generator 109 receives the maximum luminance value S111 outputted from the maximum value detector 101 and the minimum luminance value S116 outputted from the minimum value detector 107, obtains a difference between the maximum luminance value S111 and the minimum luminance value S116, performs an arithmetic operation in which the obtained difference is divided by 2 and the minimum luminance value S116 is added thereto, and outputs the operation result as a first white threshold value S108.

Next, the operation of the gradation correcting apparatus according to the fourth embodiment will be described.

The minimum value detector 107 detects the minimum luminance value S116 which is the minimum value of the luminance signal S101, for every field, according to the sampling window S102, and outputs the minimum luminance value S116.

The threshold value generator 109 performs the above-mentioned operation on the maximum luminance value S111 and the minimum luminance value S116, and outputs a first white threshold value S108. In the white comparator 102 and the white linear converter 103, the first white threshold value S108 is used in like manner as the first white threshold value S103 according to the first embodiment.

The operation of the gradation correcting apparatus 153 other than the minimum value detector 107 and the threshold value generator 109 is identical to that described for the first embodiment and, therefore, repeated description is not necessary.

As described above, the gradation correcting apparatus according to the fourth embodiment is provided with the minimum value detector 107 for detecting the minimum luminance value S116, and the threshold value generator 109 for generating a first white threshold value S108 on the basis of the maximum luminance value S111 and the minimum luminance value S116. Therefore, in addition to the effects achieved by the first embodiment, an appropriate first white threshold value S108 can be generated by effectively using the information obtained from the input video signal, and display can be carried out with the dynamic range being enlarged more appropriately according to the dynamic range of the display unit, and furthermore, the contrast of the video image constituted by the white corrected luminance signal S105 can be further enhanced.

In the threshold value generator 109 according to the fourth embodiment, "2" is employed as a value by which the difference between the maximum luminance value S111 and the minimum luminance value S116 is to be divided. However, this value may be a predetermined real number which is selected by the designer so that the output video image becomes a satisfactorily one.

Furthermore, while in this fourth embodiment the minimum value detector 107 detects the minimum luminance value S116 for every field, the present invention is not restricted thereto. For example, the minimum value detector 107 may detect the minimum luminance value S116 for every several fields or every frame.

Embodiment 5

Hereinafter, a gradation correcting apparatus according to a fifth embodiment of the present invention will be described with reference to the drawings.

Figure 7:
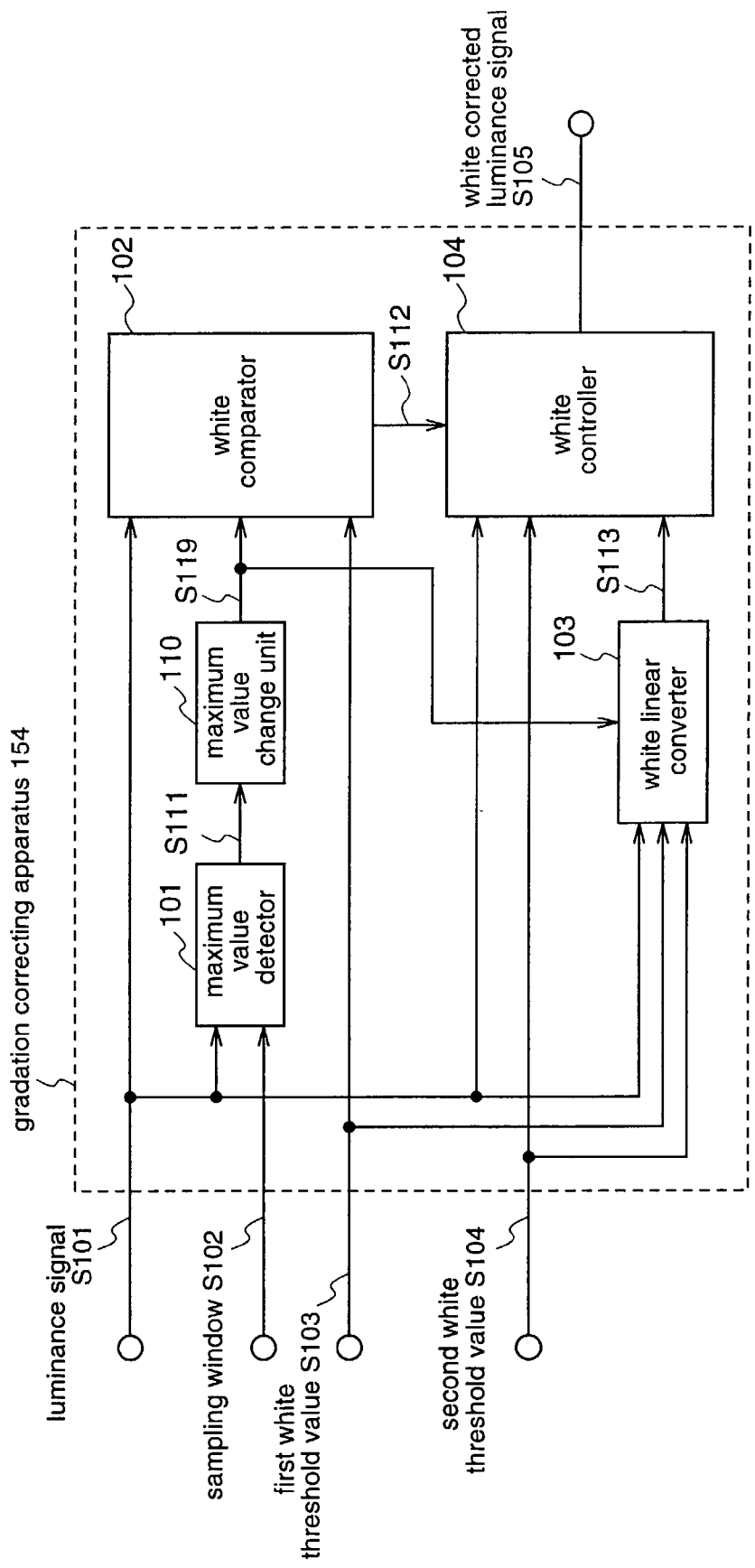
FIG. 7 is a block diagram illustrating the construction of a gradation correcting apparatus according to a fifth embodiment of the present invention.

FIG. 7 is a block diagram illustrating a gradation correcting apparatus according to the fifth embodiment.

In FIG. 7, a gradation correcting apparatus 154 is provided with a maximum value detector 101, a white comparator 102, a white linear converter 103, a white controller 104, and a maximum value change unit 110. The constructions and operations of parts other than part relating to the maximum value change unit 110 are identical to those of the gradation correcting apparatus 150 according to the first embodiment and, therefore, repeated description is not necessary.

The maximum value change unit 110 adds or subtracts a predetermined value to/from the maximum luminance value S111, and outputs the maximum luminance value S111 so changed as a changed maximum luminance value S119. As for the predetermined value to be added to or subtracted from the maximum luminance value S111 by the maximum value change unit 110, an appropriate value is previously selected by the designer, and whether the value is to be added to or subtracted from the maximum luminance value S111 is also determined by the designer.

Next, the operation of the gradation correcting apparatus according to the fifth embodiment will be described.

The maximum luminance value S111 detected by the maximum value detector 101 is inputted to the maximum value change unit 110. The maximum value change unit 110 adds or subtracts a predetermined value to/from the maximum luminance value S111, and outputs a changed maximum luminance value S119. Then, in the white comparator 102 and the white linear converter 103, the changed maximum luminance value S119 is used in like manner as the maximum luminance value S111 according to the first embodiment.

Since the operation of the gradation correcting apparatus 154 other than the maximum value change unit 110 is identical to that described for the first embodiment, repeated description is not necessary.

As described above, the gradation correcting apparatus according to the fifth embodiment is provided with the maximum value change unit 110 for changing the maximum luminance value S111. Therefore, in addition to the same effects as achieved by the first embodiment, the flexibility in performing gradation correction is increased, and display can be carried out with the dynamic range being enlarged more appropriately according to the dynamic range of the display unit.

While in this fifth embodiment the maximum value change unit 110 adds or subtracts a value predetermined by the designer to/from the maximum luminance value S111, the present invention is not restricted thereto. The maximum value change unit 110 may generate a changed maximum luminance value S119 by comparing the maximum luminance value S111 from the maximum value detector 101 with a single reference value or plural reference values which is/are predetermined, and changing the maximum luminance value S111 on the basis of the comparison result. As for the process of changing the maximum luminance value S111, for example, there is a process of subtracting a predetermined value from the maximum luminance value S111 when the maximum luminance value S11 is larger than a predetermined reference value while adding the predetermined value to the maximum luminance value S111 when the maximum luminance value S111 is smaller than the predetermined reference value, or a process of changing the maximum luminance value S111 so that the maximum luminance value S11 falls within a predetermined range.

Embodiment 6

Hereinafter, a gradation correcting apparatus according to a sixth embodiment of the present invention will be described with reference to the drawings.

Figure 8:
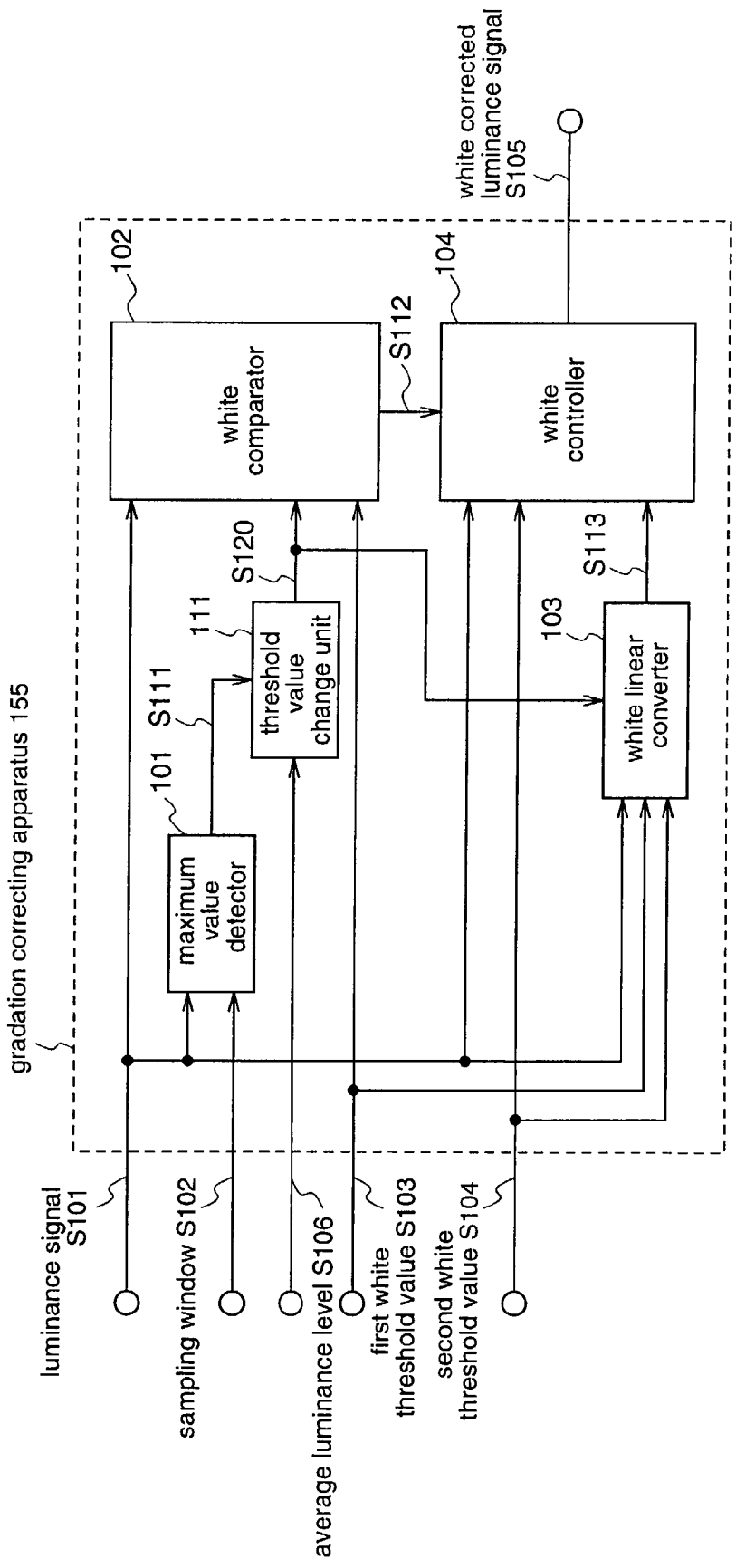
FIG. 8 is a block diagram illustrating the construction of a gradation correcting apparatus according to a sixth embodiment of the present invention.

FIG. 8 is a block diagram illustrating the construction of a gradation correcting apparatus according to the sixth embodiment.

With reference to FIG. 8, a gradation correcting apparatus 155 is provided with a maximum value detector 101, a white comparator 102, a white linear converter 103, a white controller 104, and a maximum value change unit 111. The constructions and operations of parts other than part relating to the maximum value change unit 111 are identical to those of the gradation correcting apparatus 150 of the first embodiment, and therefore, repeated description is not necessary.

The maximum value change unit 111 changes the maximum luminance value S111 outputted from the maximum value detector 101 on the basis of the average luminance level S106, and outputs the maximum luminance value S111 so changed, as a changed maximum luminance value S120.

Next, the operation of the gradation correcting apparatus according to the sixth embodiment will be described.

The maximum luminance value S111 detected by the maximum value detector 101 is inputted to the maximum value change unit 111. The maximum value change unit 111 changes the maximum luminance value S111 so as to decrease it when the average luminance level S106 is smaller than a predetermined reference value, and changes the maximum luminance value S111 so as to increase it when the average luminance level S106 is larger than the predetermined reference value. Then, the maximum value change unit 111 outputs the maximum luminance value S111 so changed, as a changed maximum luminance value S120, to the white comparator 102 and to the white linear converter 103. As for the reference value to be used for the large/small evaluation of the average luminance level S106 and the amount of change of the maximum luminance value S111, appropriate values are selected by the designer.

In the white comparator 102 and the white linear converter 103, the changed white threshold value S115 is used in like manner as the first white threshold value S103 according to the first embodiment.

The operation of the gradation correcting apparatus 151 other than the threshold value change unit 106 is identical to that described for the first embodiment and, therefore, repeated description is not necessary.

As described above, the gradation correcting apparatus according to the sixth embodiment is provided with the maximum value change unit 111 for changing the maximum luminance value S111 on the basis of the average luminance level S106, and outputting the changed maximum luminance value S120. Therefore, in addition to the same effects as achieved by the first embodiment, display can be carried out with the dynamic range being appropriately enlarged by effectively using the information obtained from the input video signal.

The amount of change by which the maximum value change unit 111 changes the maximum luminance value S111 may be a default value that is determined by the designer, or it may be a variable value that is determined on the basis of a difference between the predetermined reference value and the average luminance level S106.

Further, while in this sixth embodiment the maximum value change unit 111 compares the average luminance level S106 with a single reference value, the present invention is not restricted thereto, and there may be two or more reference values to be compared with the average luminance level S106.

Embodiment 7

Hereinafter, a gradation correcting apparatus according to a seventh embodiment of the present invention will be described with reference to the drawings.

Figure 9:
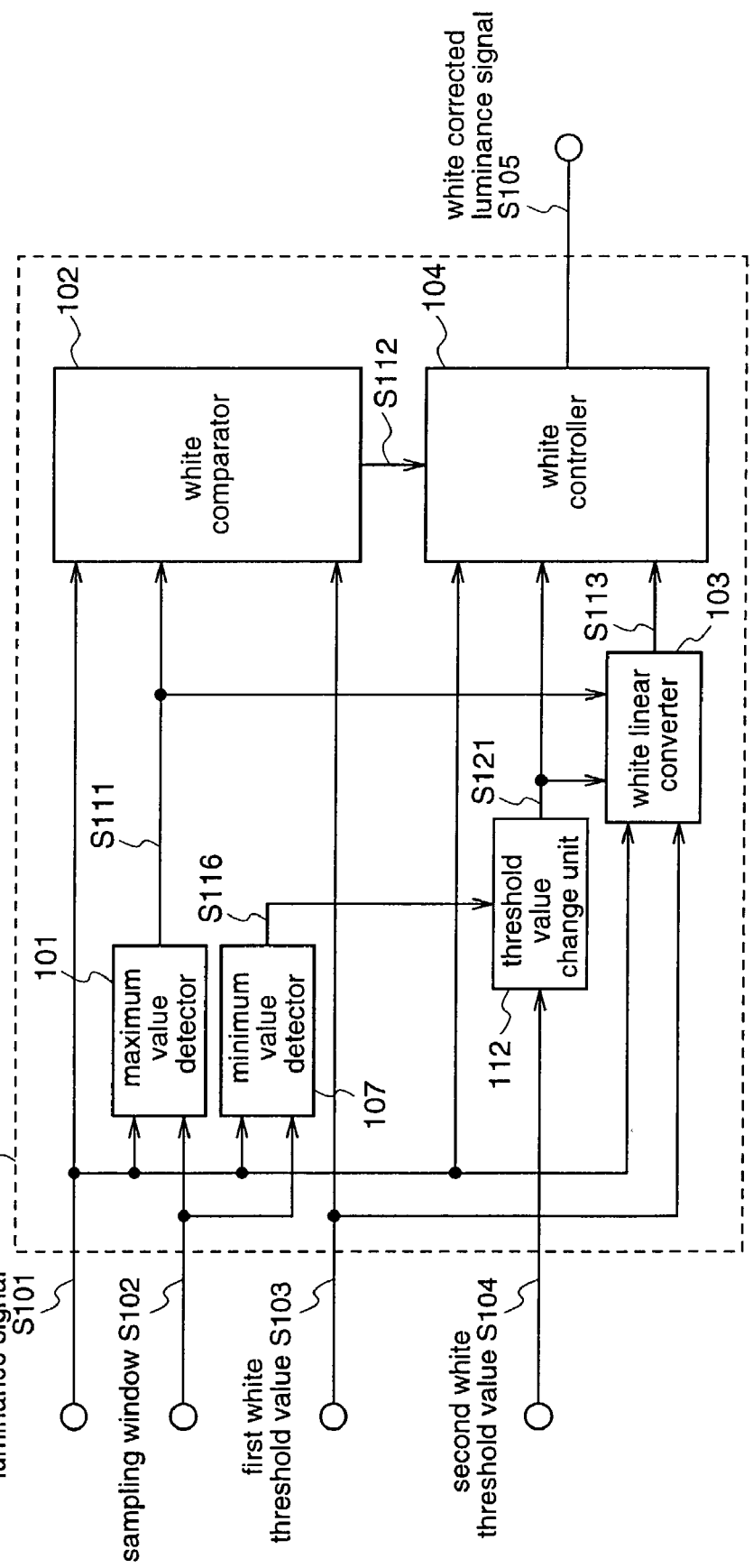
FIG. 9 is a block diagram illustrating the construction of a gradation correcting apparatus according to a seventh embodiment of the present invention.

FIG. 9 is a block diagram illustrating the construction of a gradation correcting apparatus according to the seventh embodiment.

With reference to FIG. 9, a gradation correcting apparatus 156 is provided with a maximum value detector 101, a white comparator 102, a white linear converter 103, a white controller 104, a minimum value detector 107, and a threshold value change unit 112. The construction and operation of part relating to the minimum value detector 107 are identical to those of the minimum value detector 107 according to the fourth embodiment, and the constructions and operations of parts other than parts relating to the minimum value detector 107 and the threshold value change unit 112 are identical to those of the gradation correcting apparatus 150 according to the first embodiment, and therefore, only the threshold value change unit 112 will be described hereinafter.

The threshold value change unit 112 changes the second white threshold value S104 on the basis of the minimum luminance value S116 detected by the minimum value detector 107, and outputs the second white threshold value S104 so changed, as a changed white threshold value S121.

Next, the operation of the gradation correcting apparatus according to the fourth embodiment will be described.

The threshold value change unit 112 receives the second white threshold value S104 and the minimum luminance value S116. The threshold value change unit 112 changes the second white threshold value S104 so as to decrease it when the minimum luminance value S116 is smaller than a predetermined reference value, and changes the second white threshold value S104 so as to increase it when the minimum luminance value S116 is larger than the predetermined reference value. Then, the threshold value change unit 112 outputs the second white threshold value S104 so changed, as a changed white threshold value S121, to the white linear converter 103 and to the white controller 104. As for the reference value to be used for the large/small evaluation of the minimum luminance value S116 and the amount of change of the second white threshold value S104, appropriate values are selected by the designer.

In the white linear converter 103 and the white controller 104, the changed white threshold value S121 is used in like manner as the second white threshold value S104 according to the first embodiment.

As described above, the gradation correcting apparatus according to the seventh embodiment is provided with the threshold value change unit 112 for changing the second white threshold value S104 on the basis of the minimum luminance value S116. Therefore, in addition to the effects achieved by the first embodiment, display can be carried out with the dynamic range being appropriately enlarged by effectively using the information obtained from the input video signal, and furthermore, the contrast of the video image constituted by the white corrected luminance signal S105 can be further enhanced.

The amount of change by which the threshold value change unit 112 changes the second white threshold value S104 may be a default value that is determined by the designer, or it may be a variable value that is determined on the basis of a difference between the predetermined reference value and the minimum luminance value S116.

While in this seventh embodiment the threshold value change unit 112 compares the minimum luminance value S116 with a signal reference value, the present invention is not restricted thereto, and there may be two or more reference values to be compared with the minimum luminance value S116.

Embodiment 8

Hereinafter, a gradation correcting apparatus according to an eighth embodiment of the present invention will be described with reference to the drawings.

Figure 10:
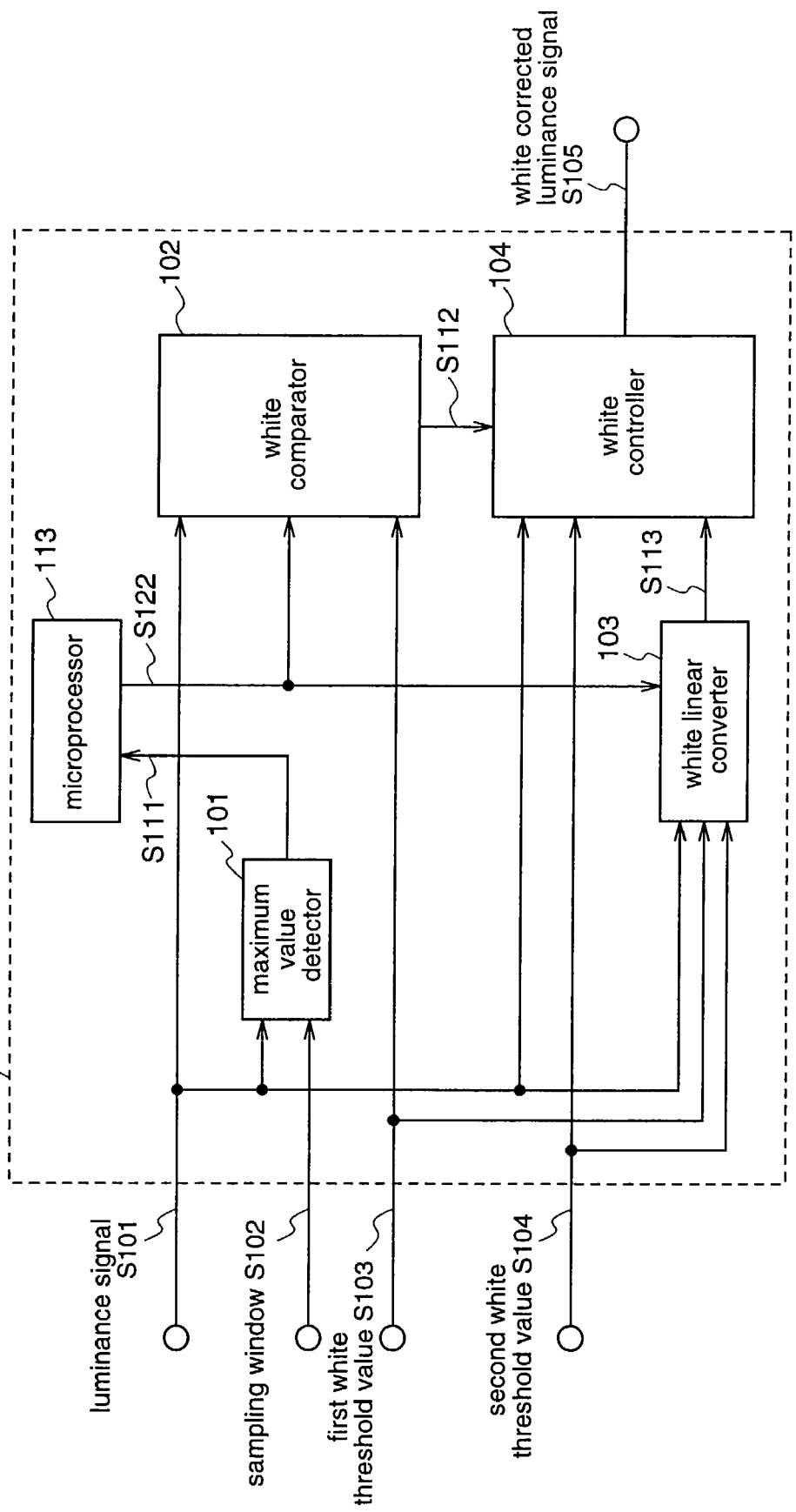
FIG. 10 is a block diagram illustrating the construction of a gradation correcting apparatus according to an eighth embodiment of the present invention.

FIG. 10 is a block diagram illustrating the construction of a gradation correcting apparatus according to the eighth embodiment.

With reference to FIG. 10, a gradation correcting apparatus 157 is provided with a maximum value detector 101, a white comparator 102, a white linear converter 103, a white controller 104, and a microprocessor 113. The constructions and operations of parts other than part relating to the microprocessor 113 are identical to those described for the gradation correcting apparatus 150 according to the first embodiment and, therefore, repeated description is not necessary.

The microprocessor 113 performs the same processing as the maximum value change unit 110 according to the fifth embodiment, and outputs a changed maximum luminance value S122.

Next, the operation of the gradation correcting apparatus according to the eighth embodiment will be described.

The microprocessor 113 performs the same processing as the maximum value change unit 110 of the fifth embodiment, on the maximum luminance value S111 detected by the maximum value detector 101, and outputs a changed maximum luminance value S122 to the white comparator 102 and to the white linear converter 103.

In the white comparator 102 and the white linear converter 103, the changed maximum luminance value S122 is used in like manner as the maximum luminance value S111 according to the first embodiment.

The operation of the gradation correcting apparatus other than the microprocessor 113 is identical to that described for the first embodiment and, therefore, repeated description is not necessary.

As described above, the gradation correcting apparatus according to the eighth embodiment is provided with the microprocessor 113 which performs the same processing as the maximum value change unit 110 of the fifth embodiment which changes the maximum luminance value S111 to generate a changed maximum luminance value. Therefore, in addition to the same effects as achieved by the fifth embodiment, the processing speed is increased by performing the processing with the microprocessor 113. Further, since the gradation correcting apparatus 157 is not required to have a circuit for performing arithmetic processing or the like, the circuit scale of the gradation correcting apparatus 157 can be reduced.

Embodiment 9

Hereinafter, a gradation correcting apparatus according to a ninth embodiment of the present invention will be described with reference to the drawings.

Figure 11:
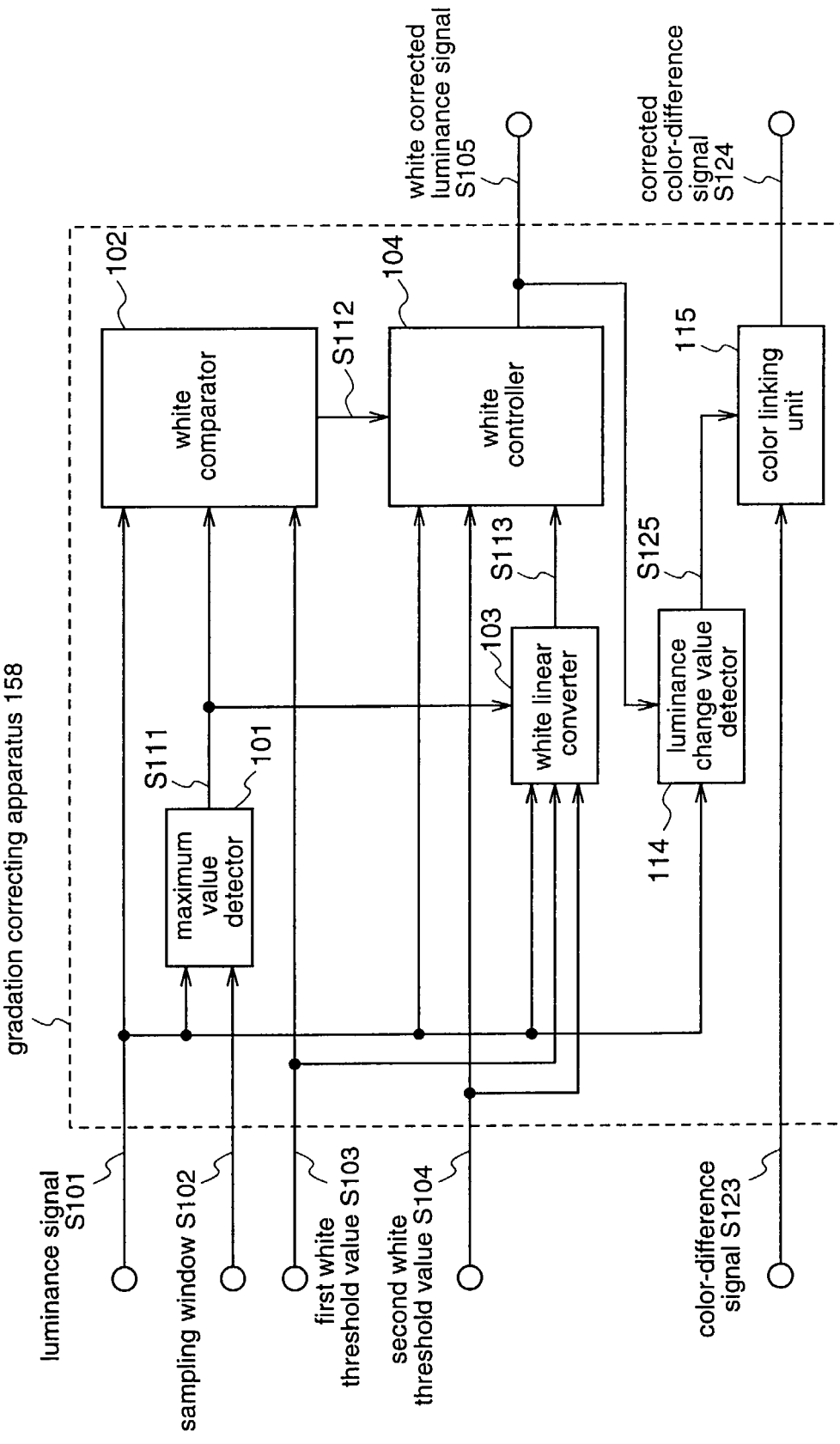
FIG. 11 is a block diagram illustrating the construction of a gradation correcting apparatus according to a ninth embodiment of the present invention.

FIG. 11 is a block diagram illustrating the construction of a gradation correcting apparatus according to the ninth embodiment.

With reference to FIG. 11, a gradation correcting apparatus 158 is provided with a maximum value detector 101, a white comparator 102, a white linear converter 103, a white controller 104, a luminance change amount detector 114, and a color linking unit 115. The constructions and operations of parts other than parts relating to the luminance change amount detector 114 and the color linking unit 115 are identical to those of the gradation correcting apparatus 150 of the first embodiment and, therefore, repeated description is not necessary.

The luminance change amount detector 114 receives the luminance signal S101 and the white corrected luminance signal S105, and obtains a difference between the luminance signal S101 and the white corrected luminance signal S105 to detect an amount of change of the luminance value that is gradation-corrected to the white side, and outputs the amount of change as a luminance change amount S125.

The color linking unit 115 corrects a color-difference signal S123 according to the luminance change amount S125 to make a balance of the color-difference signal S123 with the white corrected luminance signal S105 that is gradation-corrected to the white side.

Next, the operation of the gradation correcting apparatus according to the ninth embodiment will be described.

The luminance change amount detector 114 obtains a difference between the luminance signal S101 and the white corrected luminance signal S105, and outputs the difference as a luminance change amount S125 to the color linking unit 115. The color linking unit 115 changes the color-difference signal S123 on the basis of the luminance change amount S125, and outputs a corrected color-difference signal S124. For example, when $\Delta Y$ is inputted as the luminance change amount S125 and R-Y and B-Y are inputted as the color-difference signal S123 to the color linking unit 115, the color-difference signal S123 is converted into R-Y-ΔY and B-Y-ΔY in the color linking unit 115, and they are outputted as the corrected color-difference signal S124. Here, the ΔY is a value obtained by subtracting the luminance signal S101 from the white corrected luminance signal S105.

The operation of the gradation correcting apparatus 158 other than the luminance change amount detector 114 and the color linking unit 115 is identical to that described for the first embodiment and, therefore, repeated description is not necessary.

As described above, the gradation correcting apparatus according to the ninth embodiment is provided with the luminance change amount detector 114 for detecting the luminance change amount S125 on the basis of the luminance signal S101 and the white corrected luminance signal S105, and the color linking unit 115 for correcting the color-difference signal S123 on the basis of the luminance change amount S125 to output the corrected color-difference signal S124. Therefore, in addition to the same effects as achieved by the first embodiment, the corrected color-difference signal S124, which is obtained by correcting the color-difference signal S123 so as to be balanced with the luminance signal S101, can be obtained.

Conversion to be performed on the color-difference signal S123 by the color linking unit 115 is not restricted to the conversion described for the ninth embodiment. Any conversion may be carried out as long as the color-difference signal S123 is appropriately changed on the basis of the luminance change amount S125 that is the amount of change of the luminance signal S101, and the corrected color-difference signal S124 is balanced with the white corrected luminance signal S105.

Embodiment 10

Hereinafter, a gradation correcting apparatus and a gradation correcting method according to a tenth embodiment of the present invention will be described with reference to the drawings.

Figure 12:
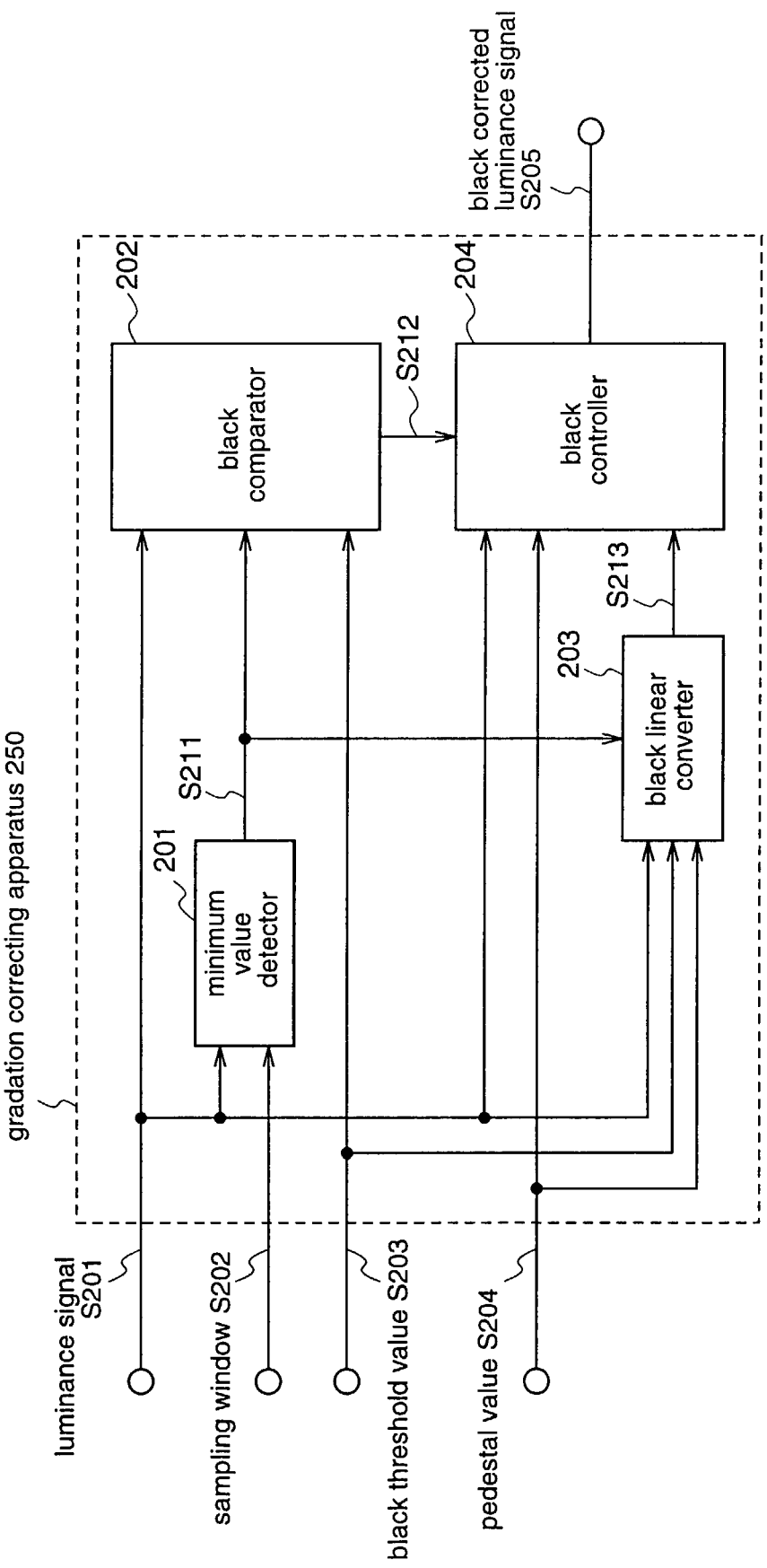
FIG. 12 is a block diagram illustrating the construction of a gradation correcting apparatus according to a tenth embodiment of the present invention.

FIG. 12 is a block diagram illustrating the construction of a gradation correcting apparatus according to the tenth embodiment.

In FIG. 12, a gradation correcting apparatus 250 is provided with a minimum value detector 201, a black comparator 202, a black linear converter 203, and a black controller 204.

The minimum value detector 201 receives a luminance signal S201 and a sampling window S202 indicating a sampling period, and outputs a minimum luminance value S211 which is the minimum value of luminance values within a predetermined period during which the luminance signal S201 is subjected to sampling.

The black comparator 202 receives the luminance signal S201, a black threshold value S203 which is a start point when correcting the gradation of the luminance signal S201, and the minimum luminance value S211 which is outputted from the minimum value detector 201, and performs large/small evaluation on them, and outputs the result as a black comparison signal S112.

The black linear converter 203 receives the luminance signal S201, the black threshold value S203 as a start point, a pedestal value S204 of the luminance signal S201, and the minimum luminance value S211 outputted from the minimum value detector 201, and performs linear conversion on the luminance signal S201 according to conversion formula (2) described later, and outputs a black linear-converted luminance signal S213 as the result of the linear conversion.

Assuming that the luminance signal S201 is X, the black linear-converted luminance signal S213 is Y, the black threshold value S203 is BSTPO, the pedestal value S204 is PLEV, and the minimum luminance value S211 is MIN, conversion formula (2) is represented as follows.

$$Y=(BSTPO-PLEV)\cdot X/(BSTPO-\text{MIN})+(PLEV-\text{MIN})$$
$$\cdot BSTPO/(BSTPO-\text{MIN}) \quad \text{conversion formula (2)}$$

The black controller 204 receives the black comparison signal S212, the luminance signal S201, the pedestal value S204, and the black linear-converted luminance signal S213, and selects one from among the luminance signal S201, the pedestal value S204, and the black linear-converted luminance signal S213 on the basis of the black comparison signal S212, and outputs the selected signal as a black corrected luminance signal S205.

Next, a description will be give of the operation of the gradation correcting apparatus and the gradation correcting method according to the tenth embodiment.

Figure 13:
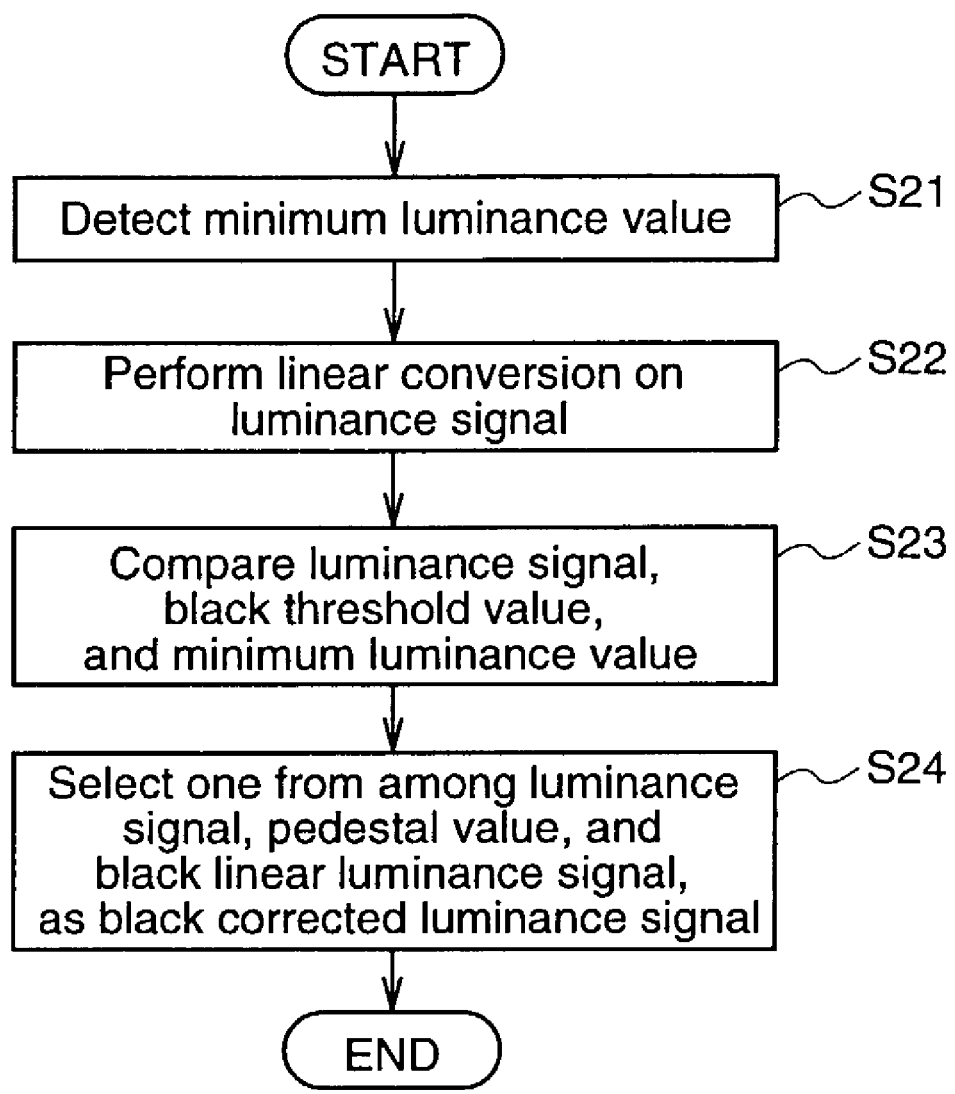
FIG. 13 is a flowchart illustrating the operation of the gradation correcting apparatus according to the tenth embodiment of the present invention.

FIG. 13 is a flowchart illustrating the operation of the gradation correcting apparatus 250 according to the tenth embodiment.

Initially, the luminance signal S201, which is a component of the input video signal, is supplied to the gradation correcting apparatus 250.

The minimum value detector 201 detects a minimum luminance value S211 which is a maximum value of the luminance signal S201, for each field, according to the sampling window S202, and outputs the minimum luminance signal S211 (step S21).

The black linear converter 203 performs linear conversion on the luminance signal S201 on the basis of conversion formula (2) to obtain a black linear-converted luminance signal S213 (step S22).

The black comparator 202 compares the luminance signal S201, the black threshold value S203, and the minimum luminance value S211, and outputs a black comparison signal S212 as the comparison result to the black controller 204 (step S23).

The minimum luminance value S211, which is used for the comparison with the luminance signal S201 or the like in the black comparator 202 or for the linear conversion of the luminance signal S201 in the black linear converter 203, has been obtained in a field that is just previous to a field to which the luminance signal S201 used for the comparison or linear conversion belongs.

The black controller 204 selects a black corrected luminance signal S205 from among the luminance signal S201, the pedestal value S204, and the black linear-converted luminance signal S213, on the basis of the black comparison signal S212, and outputs it (step S24).

More specifically, when the black comparison signal S212 indicates that the luminance signal S201 is equal to or larger than the black threshold value S203, the black controller 204 outputs the luminance signal S201 as the black corrected luminance signal S205 regardless of the value of the minimum luminance value S211. Further, when the black comparison signal S212 indicates that the luminance signal S201 is smaller than the black threshold value S203 and equal to or larger than the minimum luminance signal S211, the black controller 204 outputs the black linear-converted luminance signal S213 outputted from the black linear converter 203, as the black corrected luminance signal S205. Furthermore, when the black comparison signal S212 indicates that the luminance signal S201 is smaller than the black threshold value S203 and smaller than the minimum luminance value S211, the black controller 204 outputs the pedestal value S204 as the black corrected luminance signal S205.

The black threshold value S203 and the pedestal value S204 are set so that the black corrected luminance signal S205 to be outputted from the gradation correcting apparatus 250 becomes an appropriate one, by the designer of the gradation correcting apparatus 250 with referring to the output video image displayed on a display unit (not shown). The black threshold value S203 and the pedestal value S204 are stored in a predetermined memory (not shown), and are read from the memory by the black linear converter 203 or the like.

By repeating the processes of steps S11 to S14 in the flowchart shown in FIG. 13, black-side gradation correction is performed on the luminance signal S201.

The black corrected luminance signal S205 outputted from the gradation correcting apparatus 250 as well as the color-difference signals are converted into RGB signals, whereby a gradation-corrected video image is displayed on the display unit (not shown).

Figure 14:
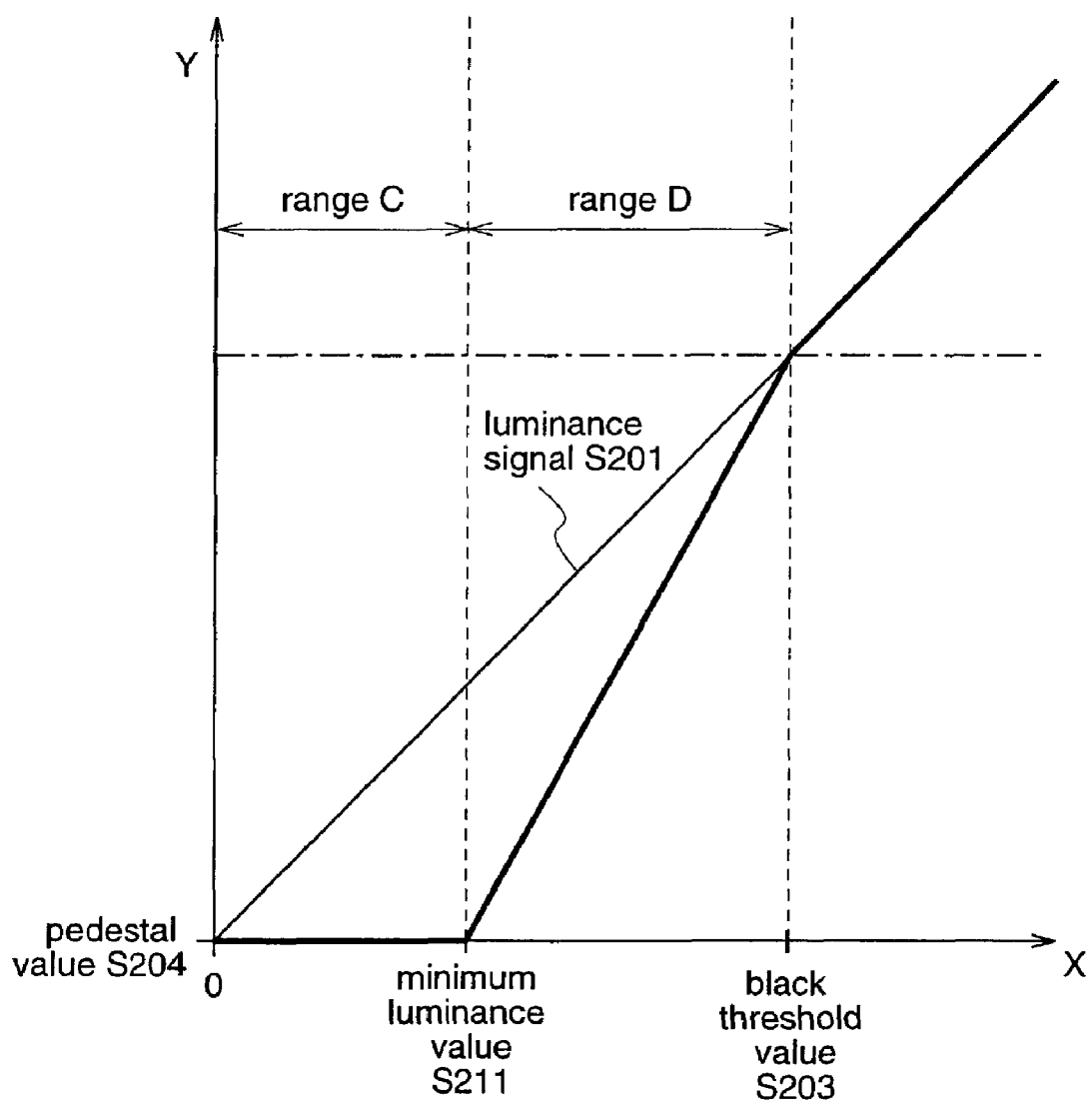
FIG. 14 is a diagram for explaining the operation of the gradation correcting apparatus according to the tenth embodiment of the present invention.

FIG. 14 is a diagram illustrating the relationship between the luminance signal S201 and the black corrected luminance signal S205.

When taking the luminance signal S201 on the X axis and the black corrected luminance signal S205 on the Y axis, the relationship between the luminance signal S201 and the black corrected luminance signal S205 becomes a graph shown in FIG. 14. However, it is premised that the minimum luminance signal S211 is smaller than the black threshold value S203.

As described above, when the luminance signal S201 is within a range D shown in FIG. 14, a black corrected luminance signal S205 which is obtained by linear-converting the luminance signal S201 into a straight line connecting the minimum black value S211 and the black threshold value S203, is outputted. Further, when the luminance signal S201 is within a range C shown in FIG. 14, the pedestal value S204 is outputted as a black corrected luminance signal S205.

As described above, the gradation correcting apparatus according to the tenth embodiment is provided with the minimum value detector 201 for detecting the minimum luminance value S211; the black comparator 202 for comparing the luminance signal S201, the black threshold value S203, and the minimum luminance value S211; the black linear converter 203 for performing linear conversion on the luminance signal S201; and the black controller 204 for selecting one from among the luminance signal S201, the pedestal value S204, and the black linear converted luminance signal S213, on the basis of the comparison result in the black comparator 202, and outputting it as the black corrected luminance signal S205. Therefore, stable correction of the gradation of the luminance signal S201 can be carried out without using a feedback system. Further, since the black level is extended to the pedestal value S204 when the luminance signal S201 is within the range D, the most of the expressible black side can be expressed, whereby the dynamic range can be enlarged.

While in this tenth embodiment the minimum value detector 201 detects the minimum luminance value S211 for every field, the present invention is not restricted thereto. For example, the minimum value detector 201 may detect the minimum luminance value S211 for every several fields or every frame.

Furthermore, in the flowchart shown in FIG. 13 according to the tenth embodiment, the process in step S22 and the process in step S23 may be simultaneously performed irrespective of the order.

Embodiment 11

Hereinafter, a gradation correcting apparatus according to an eleventh embodiment of the present invention will be described with reference to the drawings.

Figure 15:
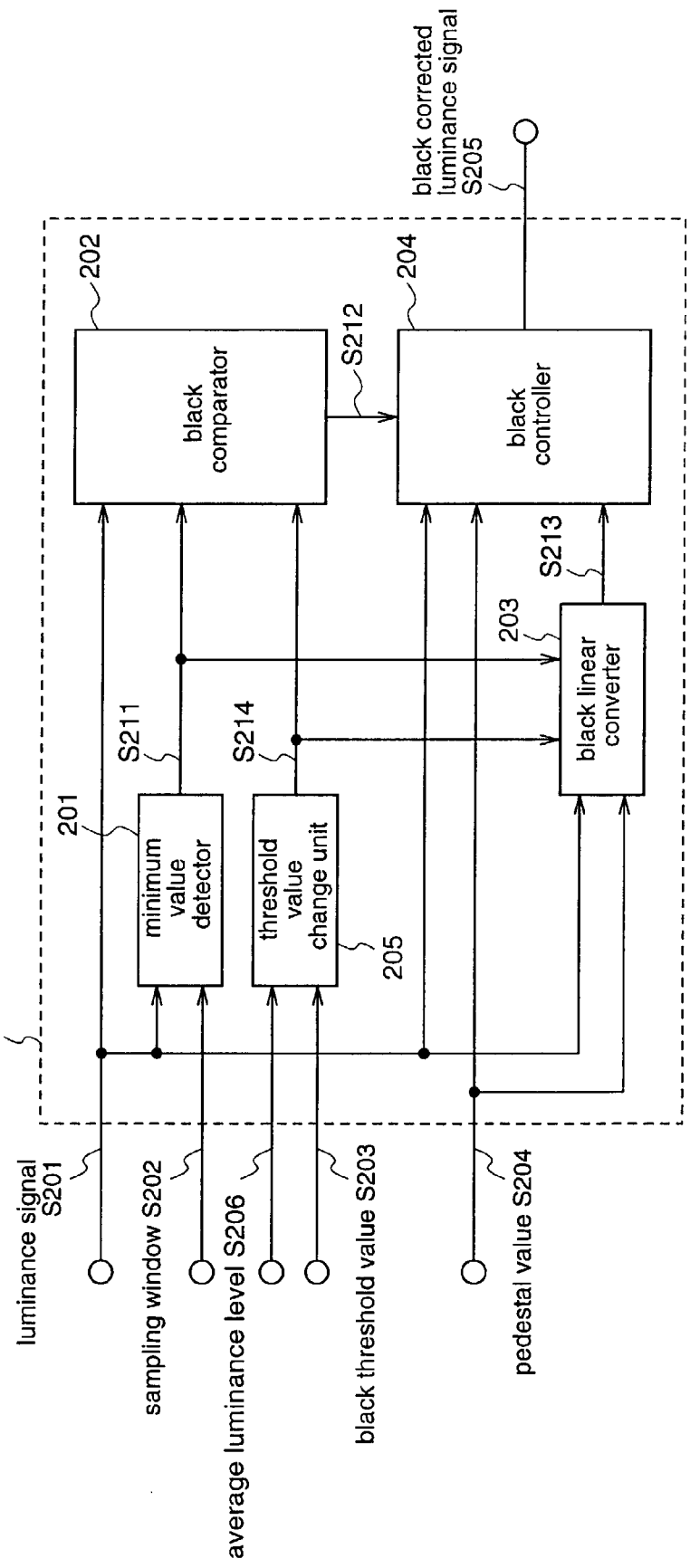
FIG. 15 is a block diagram illustrating the construction of a gradation correcting apparatus according to an eleventh embodiment of the present invention.

FIG. 15 is a block diagram illustrating the construction of a gradation correcting apparatus according to the eleventh embodiment.

With reference to FIG. 15, a gradation correcting apparatus 251 is provided with a minimum value detector 201, a black comparator 202, a black linear converter 203, a black controller 204, and a threshold value change unit 205. The constructions and operations of parts other than part relating to the threshold value change unit 205 are identical to those of the gradation correcting apparatus 250 of the tenth embodiment and, therefore, repeated description is not necessary.

The threshold value change unit 205 changes a black threshold value S203 on the basis of an average luminance level S206 which is obtained by averaging luminance levels over a predetermined period of time, e.g., one field or several fields of a luminance signal S201, and outputs the black threshold value S203 so changed, as a changed black threshold value S214.

Next, the operation of the gradation correcting apparatus according to the eleventh embodiment will be described.

The threshold value change unit 205 receives the average luminance level S206 and the black threshold value S203. Then, the threshold value change unit 205 changes the black threshold value S203 so as to decrease it when the average luminance level S206 is smaller than a predetermined reference value, and changes the black threshold value S203 so as to increase it when the average luminance level S206 is larger than the predetermined reference value. The threshold value change unit 205 outputs the changed value of the black threshold value S203, as a changed black threshold value S214, to the black comparator 202 and to the black linear converter 203. As for the reference value to be used for the large/small evaluation of the average luminance level S206 and the amount of change of the black threshold value S203, appropriate values are selected by the designer.

In the black comparator 202 and the black linear converter 203, the changed black threshold value S214 is used in like manner as the black threshold value S204 described for the first embodiment.

The operation of the gradation correcting apparatus 251 other than the threshold value change unit 205 is identical to that described for the tenth embodiment and, therefore, repeated description is not necessary.

As described above, the gradation correcting apparatus according to the eleventh embodiment is provided with the threshold value change unit 205 for changing the black threshold value S203 on the basis of the average luminance level S206, and outputting the changed black threshold value S214. Therefore, in addition to the effects of the tenth embodiment, the black threshold value S203 can be appropriately changed according to the condition of the luminance signal S201 over one field or several fields, and display can be carried out with the dynamic range being enlarged more appropriately according to the dynamic range of the display unit, and furthermore, the contrast of the video image constituted by the black corrected luminance signal S205 can be enhanced.

The amount of change of the black threshold value S203 by the threshold value change unit 205 may be a default value that is determined by the designer, or it may be a variable value that is determined on the basis of a difference between a predetermined reference value and the average luminance level S206.

While in this eleventh embodiment the threshold value change unit 205 compares the average luminance level S206 with a single reference value, the present invention is not restricted thereto, and there may be two or more reference values to be compared with the average luminance level S206. For example, the threshold value change unit 205 changes the black threshold value S203 so as to decrease it when the average luminance level S206 is smaller than a first reference value, does not change the black threshold value S203 when the average luminance level S206 is between the first reference value and a second reference value that is larger than the first reference value, and changes the black threshold value S203 so as to increase it when the average luminance level S206 is larger than the second reference value.

Embodiment 12

Hereinafter, a gradation correcting apparatus according to a twelfth embodiment of the present invention will be described with reference to the drawings.

Figure 16:
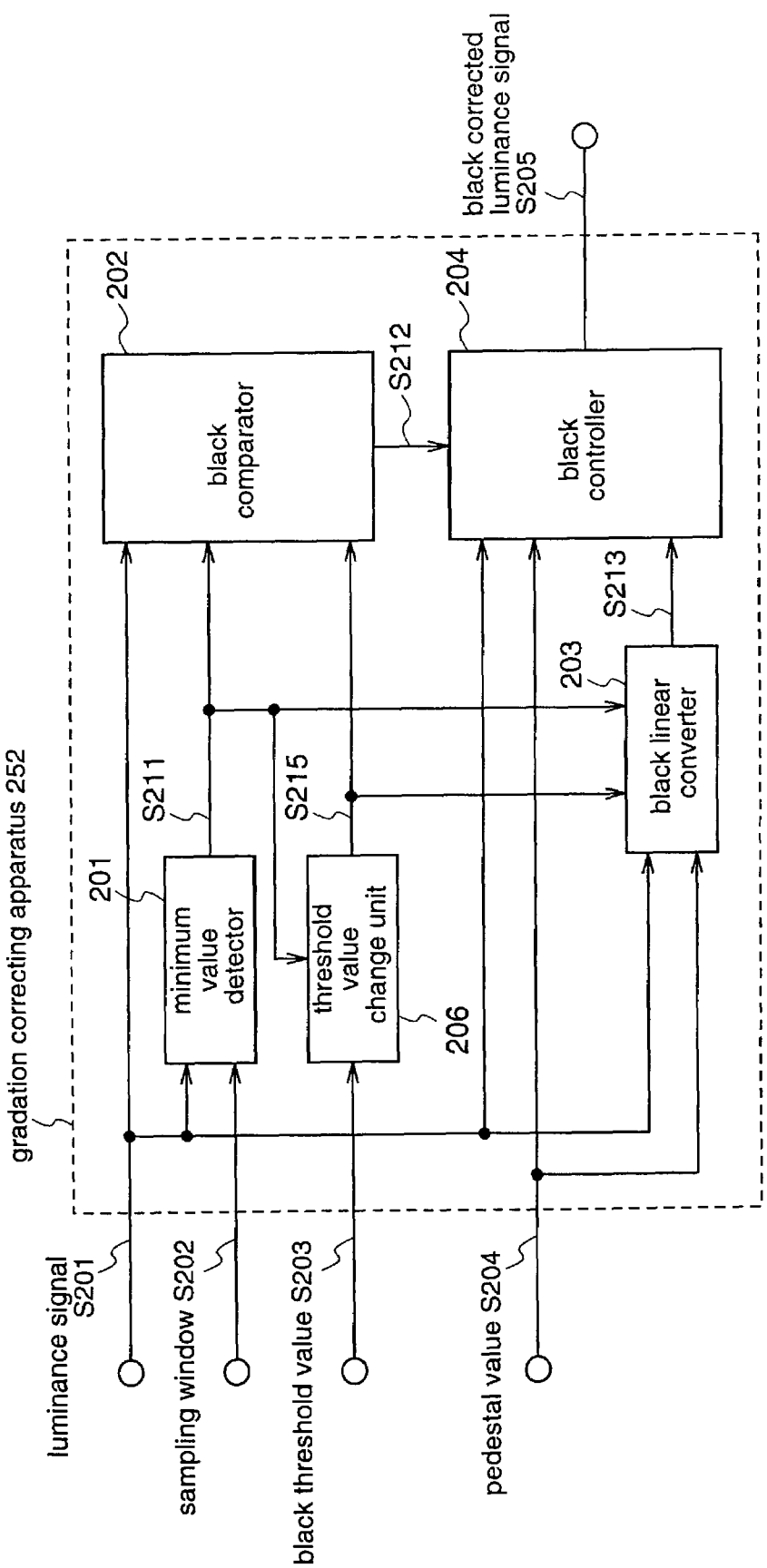
FIG. 16 is a block diagram illustrating the construction of a gradation correcting apparatus according to a twelfth embodiment of the present invention.

FIG. 16 is a block diagram illustrating the construction of a gradation correcting apparatus according to the twelfth embodiment.

With reference to FIG. 16, a gradation correcting apparatus 252 is provided with a minimum value detector 201, a black comparator 202, a black linear converter 203, a black controller 204, and a threshold value change unit 206. The constructions and operations of parts other than part relating to the threshold value change unit 206 are identical to those of the gradation correcting apparatus 250 of the tenth embodiment and, therefore, repeated description is not necessary.

The threshold value change unit 206 changes a black threshold value S203 on the basis of a minimum luminance value S211, and outputs the black threshold value S203 so changed as a changed black threshold value S215.

Next, the operation of the gradation correcting apparatus according to the twelfth embodiment will be described.

The threshold value change unit 206 receives the minimum luminance value S211 and the black threshold value S203. The threshold value change unit 206 changes the black threshold value S203 so as to decrease it when the minimum luminance value S211 is smaller than a predetermined reference value, and changes the black threshold value S203 so as to increase it when the minimum luminance value S211 is larger than the predetermined reference value. The threshold value change unit 206 generates a changed black threshold value S215, and outputs it to the black comparator 202 and to the black linear converter 203. As for the reference value to be used for the large/small evaluation of the minimum luminance value S211 and the amount of change of the black threshold value S203, appropriate values are selected by the designer.

In the black comparator 202 and the black linear converter 203, the changed black threshold value S215 is used in like manner as the black threshold value S203 according to the tenth embodiment.

The operation of the gradation correcting apparatus 252 other than the threshold value change unit 206 is identical to that described for the tenth embodiment and, therefore, repeated description is not necessary.

As described above, the gradation correcting apparatus according to the twelfth embodiment is provided with the threshold value change unit 206 for changing the black threshold value S203 on the basis of the minimum luminance level S211, and outputting the changed black threshold value S215. Therefore, in addition to the same effects as described for the tenth embodiment, display can be carried out with the dynamic range being appropriately enlarged by effectively using the information obtained from the input video signal, and furthermore, the contrast of the video image constituted by the black corrected luminance signal S205 can be further enhanced.

The amount of change of the black threshold value S203 by the threshold value change unit 205 may be a default value that is determined by the designer, or it may be a variable value that is determined on the basis of a difference between a predetermined reference value and the minimum luminance level S211.

While in this twelfth embodiment the threshold value change unit 206 compares the minimum luminance level S211 with a single reference value, the present invention is not restricted thereto, and there may be two or more reference values to be compared with the minimum luminance value S211. For example, the threshold value change unit 206 changes the black threshold value S203 so as to decrease it when the minimum luminance level S211 is smaller than a first reference value, does not change the black threshold value S203 when the minimum luminance level S211 is between the first reference value and a second reference value that is larger than the first reference value, and changes the black threshold value S203 so as to increase it when the minimum luminance level S211 is larger than the second reference value.

Embodiment 13

Hereinafter, a gradation correcting apparatus according to a thirteenth embodiment of the present invention will be described with reference to the drawings.

Figure 17:
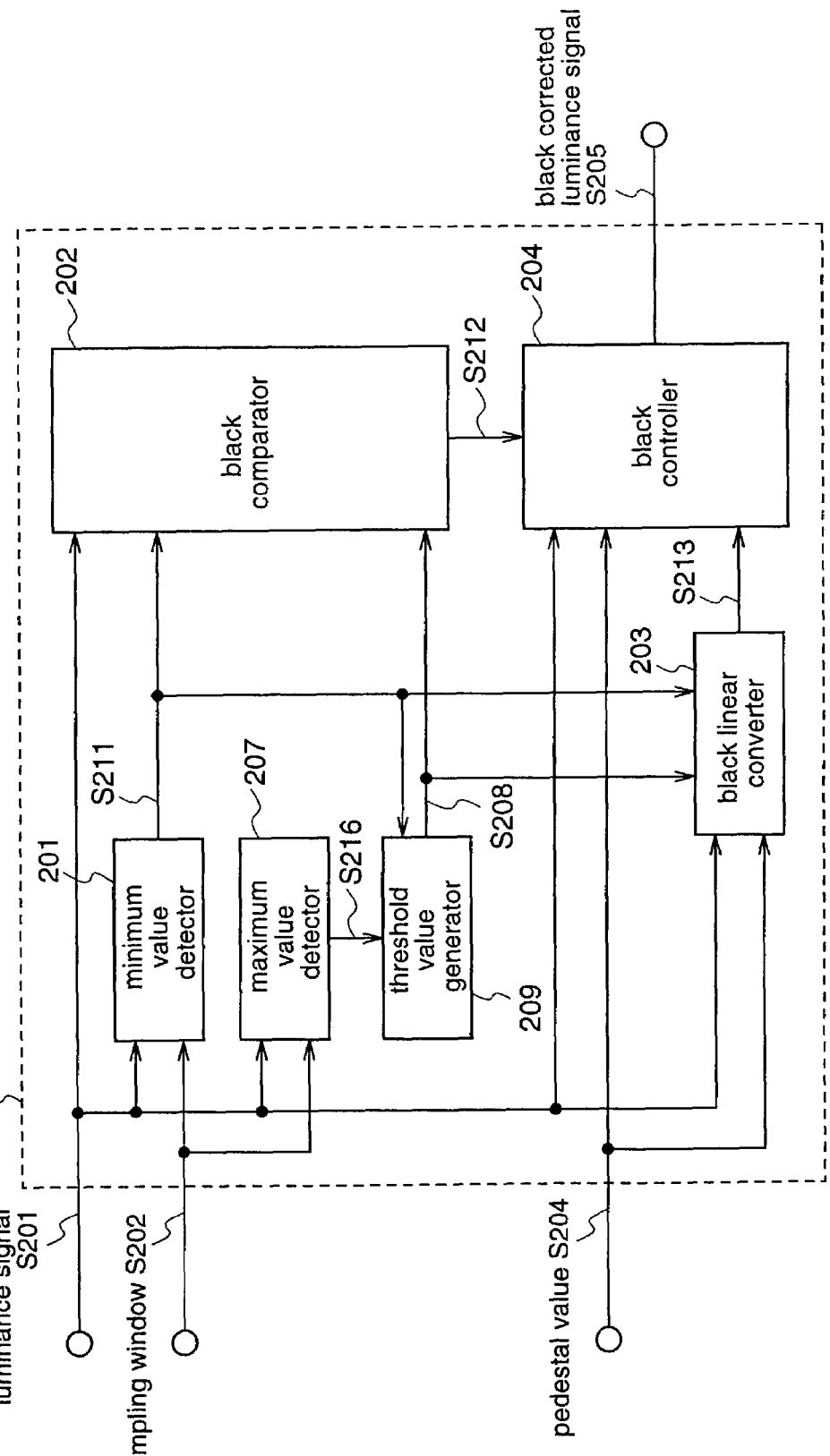
FIG. 17 is a block diagram illustrating the construction of a gradation correcting apparatus according to a thirteenth embodiment of the present invention.

FIG. 17 is a block diagram illustrating the construction of a gradation correcting apparatus according to the thirteenth embodiment.

With reference to FIG. 17, a gradation correcting apparatus 253 is provided with a minimum value detector 201, a black comparator 202, a black linear converter 203, a black controller 204, a maximum value detector 207, and a threshold value generator 209. The constructions and operations of parts other than part relating to the maximum value detector 207 and the threshold value generator 209 are identical to those of the gradation correcting apparatus 250 of the tenth embodiment, and therefore, repeated description is not necessary.

The maximum value detector 207 receives a luminance signal S201 and a sampling window S202 indicating a sampling period, and outputs a maximum luminance value S216 that is a maximum value of luminance values within a predetermined period that is subjected to sampling.

The threshold value generator 209 receives the minimum luminance value S211 outputted from the minimum value detector 201 and the maximum luminance value S216 outputted from the maximum value detector 207, obtains a difference between the maximum luminance value S216 and the minimum luminance value S211, performs an arithmetic operation in which the obtained difference is divided by 2 and the minimum luminance value S211 is added to the result of the division, and outputs the operation result as a black threshold value S208.

Next, the operation of the gradation correcting apparatus according to the thirteenth embodiment will be described.

The maximum value detector 207 detects a maximum luminance value S216 that is the maximum value of the luminance signal S101, for every field, according to the sampling window S202, and outputs the maximum luminance value S216.

The threshold value generator 209 performs the above-mentioned operation on the minimum luminance value S211 and the maximum luminance value S216, and outputs a black threshold value S208. In the black comparator 202 and the black linear converter 203, the black threshold value S208 is used in like manner as the black threshold value S203 according to the tenth embodiment.

The operation of the gradation correcting apparatus 253 other than the maximum value detector 207 and the threshold value generator 209 is identical to that described for the tenth embodiment and, therefore, repeated description is not necessary.

As described above, the gradation correcting apparatus according to the thirteenth embodiment is provided with the maximum value detector 207 for detecting the maximum luminance value S216, and the threshold value generator 209 for generating a black threshold value S208 on the basis of the minimum luminance value S211 and the maximum luminance value S216. Therefore, in addition to the same effects as described for the tenth embodiment, an appropriate black threshold value S208 can be generated by effectively using the information obtained from the input video signal, and display can be carried out with the dynamic range being enlarged more appropriately according to the dynamic range of the display unit, and furthermore, the contrast of the video image constituted by the black corrected luminance signal S205 can be further enhanced.

In the threshold value generator 209 according to the thirteenth embodiment, "2" is employed as a value by which the difference between the maximum luminance value S216 and the minimum luminance value S211 is divided. However, this value may be a predetermined real number which is selected by the designer so that the output video image becomes a satisfactorily one.

Furthermore, while in this thirteenth embodiment the maximum value detector 207 detects the maximum luminance value S216 for every field, the present invention is not restricted thereto. For example, the maximum value detector 207 may detect the maximum luminance value S216 for every several fields or every frame.

Embodiment 14

Hereinafter, a gradation correcting apparatus according to a fourteenth embodiment of the present invention will be described with reference to the drawings.

Figure 18:
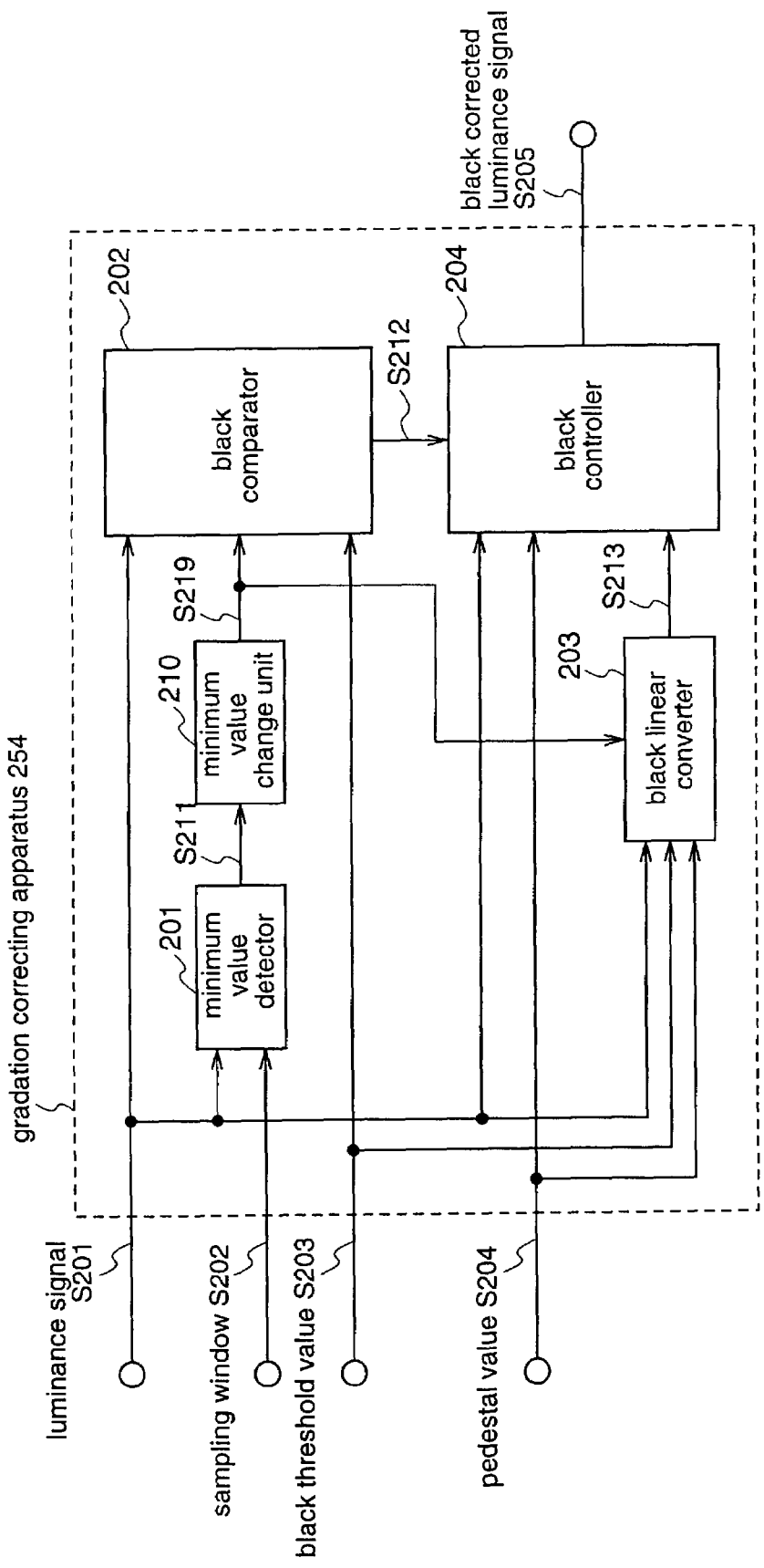
FIG. 18 is a block diagram illustrating the construction of a gradation correcting apparatus according to a fourteenth embodiment of the present invention.

FIG. 18 is a block diagram illustrating a gradation correcting apparatus according to the fourteenth embodiment.

In FIG. 18, a gradation correcting apparatus 254 is provided with a minimum value detector 201, a black comparator 202, a black linear converter 203, a black controller 204, and a minimum value change unit 210. The constructions and operations of parts other than part relating to the minimum value change unit 210 are identical to those of the gradation correcting apparatus 250 of the tenth embodiment and, therefore, repeated description is not necessary.

The minimum value change unit 210 adds or subtracts a predetermined value to/from the minimum luminance value S211, and outputs the minimum luminance value S211 so changed as a changed minimum luminance value S219. As for the predetermined value to be added to or subtracted from the minimum luminance value S211 by the minimum value change unit 210, an appropriate value is previously selected by the designer, and whether the value is to be added to or subtracted from the minimum luminance value S211 is also determined by the designer.

Next, the operation of the gradation correcting apparatus according to the fourteenth embodiment will be described.

The minimum luminance value S211 detected by the minimum value detector 201 is inputted to the minimum value change unit 210. The minimum value change unit 210 adds or subtracts a predetermined value to/from the minimum luminance value S211, and outputs a changed minimum luminance value S219. Then, in the black comparator 202 and the black linear converter 203, the changed minimum luminance value S119 is used in like manner as the minimum luminance value S211 according to the tenth embodiment.

Since the operation of the gradation correcting apparatus 254 other than the minimum value change unit 210 is identical to that described for the tenth embodiment, repeated description is not necessary.

As described above, the gradation correcting apparatus according to the fourteenth embodiment is provided with the minimum value change unit 210 for changing the minimum luminance value S211. Therefore, in addition to the same effects as described for the tenth embodiment, the flexibility in performing gradation correction is increased, whereby display can be carried out with the dynamic range being enlarged more appropriately according to the dynamic range of the display unit.

While in this fourteenth embodiment the minimum value change unit 210 adds or subtracts a value that is predetermined by the designer to/from the minimum luminance value S211, the present invention is not restricted thereto. The minimum value change unit 210 may generate a changed minimum luminance value S219 by comparing the minimum luminance value S211 from the minimum value detector 201 with a predetermined single reference value or plural reference values, and changing the minimum luminance value S211 on the basis of the comparison result. As for the process of changing the minimum luminance value S211, for example, there is a process of subtracting a predetermined value from the minimum luminance value S211 when the minimum luminance value S211 is larger than a predetermined reference value while adding the predetermined value to the minimum luminance value S211 when the minimum luminance value S211 is smaller than the predetermined reference value, or a process of changing the minimum luminance value S211 so that the minimum luminance value S211 falls within a predetermined range.

Embodiment 15

Hereinafter, a gradation correcting apparatus according to a fifteenth embodiment of the present invention will be described with reference to the drawings.

Figure 19:
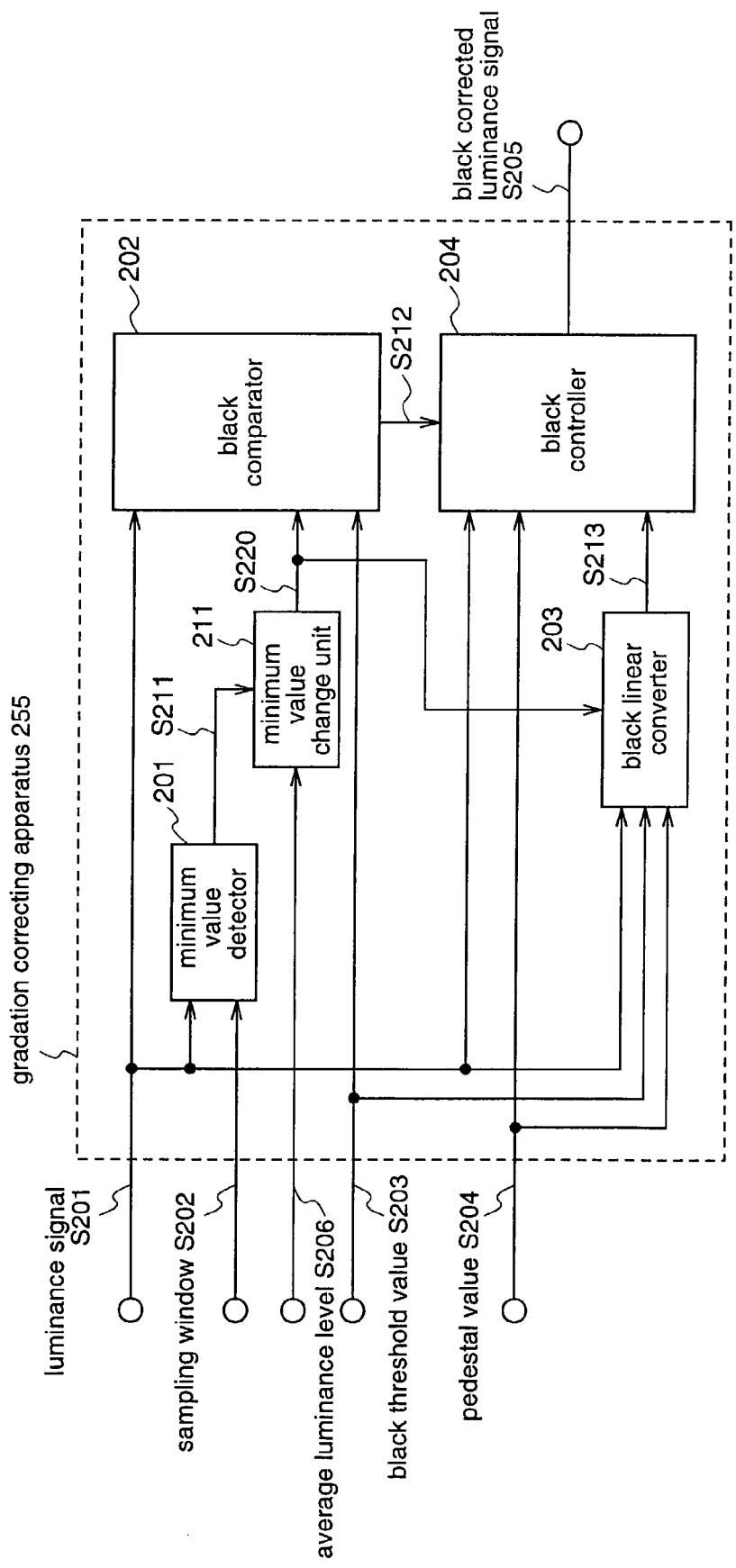
FIG. 19 is a block diagram illustrating the construction of a gradation correcting apparatus according to a fifteenth embodiment of the present invention.

FIG. 19 is a block diagram illustrating the construction of a gradation correcting apparatus according to the fifteenth embodiment.

With reference to FIG. 19, a gradation correcting apparatus 255 is provided with a minimum value detector 201, a black comparator 202, a black linear converter 203, a black controller 204, and a minimum value change unit 211. The constructions and operations of parts other than part relating to the minimum value change unit 211 are identical to those of the gradation correcting apparatus 250 of the tenth embodiment, and therefore, repeated description is not necessary.

The minimum value change unit 211 changes the minimum luminance value S211 outputted from the minimum value detector 201 on the basis of the average luminance level S206, and outputs the minimum luminance value S211 so changed as a changed minimum luminance value S220.

Next, the operation of the gradation correcting apparatus according to the fifteenth embodiment will be described.

The minimum luminance value S211 detected by the minimum value detector 201 is inputted to the minimum value change unit 211. The minimum value change unit 211 changes the minimum luminance value S211 so as to decrease it when the average luminance level S206 is smaller than a predetermined reference value, and changes the minimum luminance value S211 so as to increase it when the average luminance level S206 is larger than the predetermined reference value. Then, the minimum value change unit 211 outputs the minimum luminance value S211 so changed, as a changed minimum luminance value S220, to the black comparator 202 and to the black linear converter 203. As for the reference value to be used for the large/small evaluation of the average luminance level S206 and the amount of change of the minimum luminance value S211, appropriate values are selected by the designer.

In the black comparator 202 and the black linear converter 203, the changed minimum luminance value S220 is used in the same manner as the minimum luminance value S211 of the tenth embodiment.

The operation of the gradation correcting apparatus 255 other than the minimum value change unit 211 is identical to that described for the tenth embodiment and, therefore, repeated description is not necessary.

As described above, the gradation correcting apparatus according to the fifteenth embodiment is provided with the minimum value change unit 211 for changing the minimum luminance value S211 on the basis of the average luminance level S206, and outputting the changed minimum luminance value S220. Therefore, in addition to the same effects as described for the tenth embodiment, display can be carried out with the dynamic range that is appropriately enlarged, by effectively using information obtained from the input video signal.

The amount of change of the minimum luminance value S211 by the minimum value change unit 211 may be a default value that is determined by the designer, or it may be a variable value that is determined on the basis of a difference between a predetermined reference value and the average luminance level S206.

Further, while in this fifteenth embodiment the minimum value change unit 211 compares the average luminance level S206 with a single reference value, the present invention is not restricted thereto, and there may be two or more reference values to be compared with the average luminance level S206.

Embodiment 16

Hereinafter, a gradation correcting apparatus according to a sixteenth embodiment of the present invention will be described with reference to the drawings.

Figure 20:
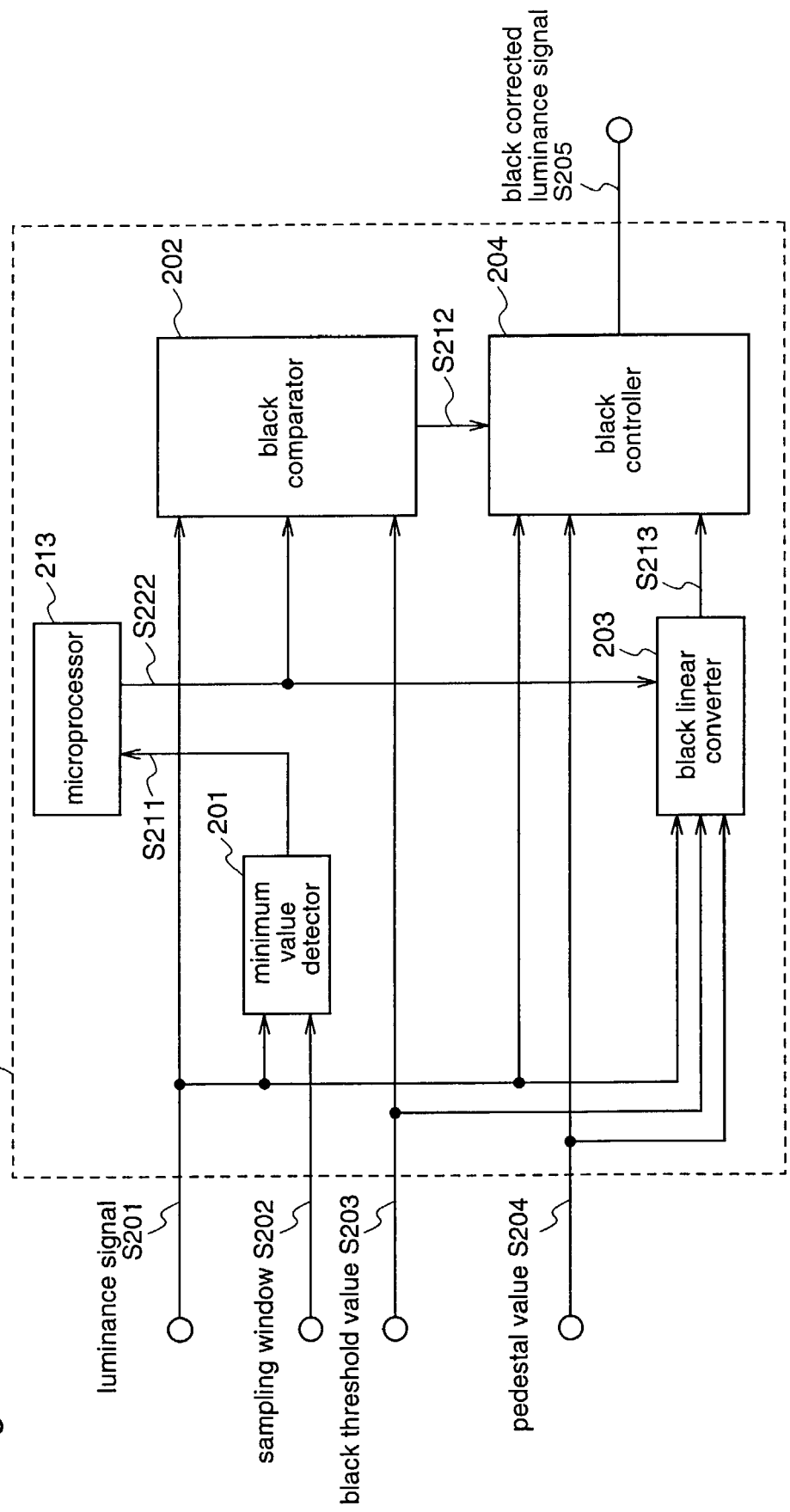
FIG. 20 is a block diagram illustrating the construction of a gradation correcting apparatus according to a sixteenth embodiment of the present invention.

FIG. 20 is a block diagram illustrating the construction of a gradation correcting apparatus according to the sixteenth embodiment.

With reference to FIG. 20, a gradation correcting apparatus 256 is provided with a minimum value detector 201, a black comparator 202, a black linear converter 203, a black controller 204, and a microprocessor 213. The constructions and operations of parts other than part relating to the microprocessor 213 are identical to those described for the gradation correcting apparatus 250 according to the tenth embodiment and, therefore, repeated description is not necessary.

The microprocessor 213 performs the same process as the minimum value change unit 210 according to the fourteenth embodiment, and outputs a changed minimum luminance value S222.

Next, the operation of the gradation correcting apparatus according to the sixteenth embodiment will be described.

The microprocessor 213 performs the same processing as the minimum value change unit 210 of the fourteenth embodiment, on the minimum luminance value S211 detected by the minimum value detector 201, and outputs a changed minimum luminance value S222 to the black comparator 202 and to the black linear converter 203.

In the black comparator 202 and the black linear converter 203, the changed minimum luminance value S222 is used in like manner as the minimum luminance value S211 according to the tenth embodiment.

The operation of the gradation correcting apparatus 256 other than the microprocessor 213 is identical to that described for the tenth embodiment and, therefore, repeated description is not necessary.

As described above, the gradation correcting apparatus according to the fifteenth embodiment is provided with the microprocessor 213 which performs the same processing as the minimum value change unit 210 of the fourteenth embodiment that changes the minimum luminance value S211 to generate a changed minimum luminance value. Therefore, in addition to the same effects as described for the fourteenth embodiment, the processing speed can be increased by performing the processing with the microprocessor 213. Further, since the gradation correcting apparatus 253 is not required to have a circuit for performing arithmetic processing or the like, the circuit scale of the gradation correcting apparatus 256 can be reduced.

Embodiment 17

Hereinafter, a gradation correcting apparatus according to a seventeenth embodiment of the present invention will be described with reference to the drawings.

Figure 21:
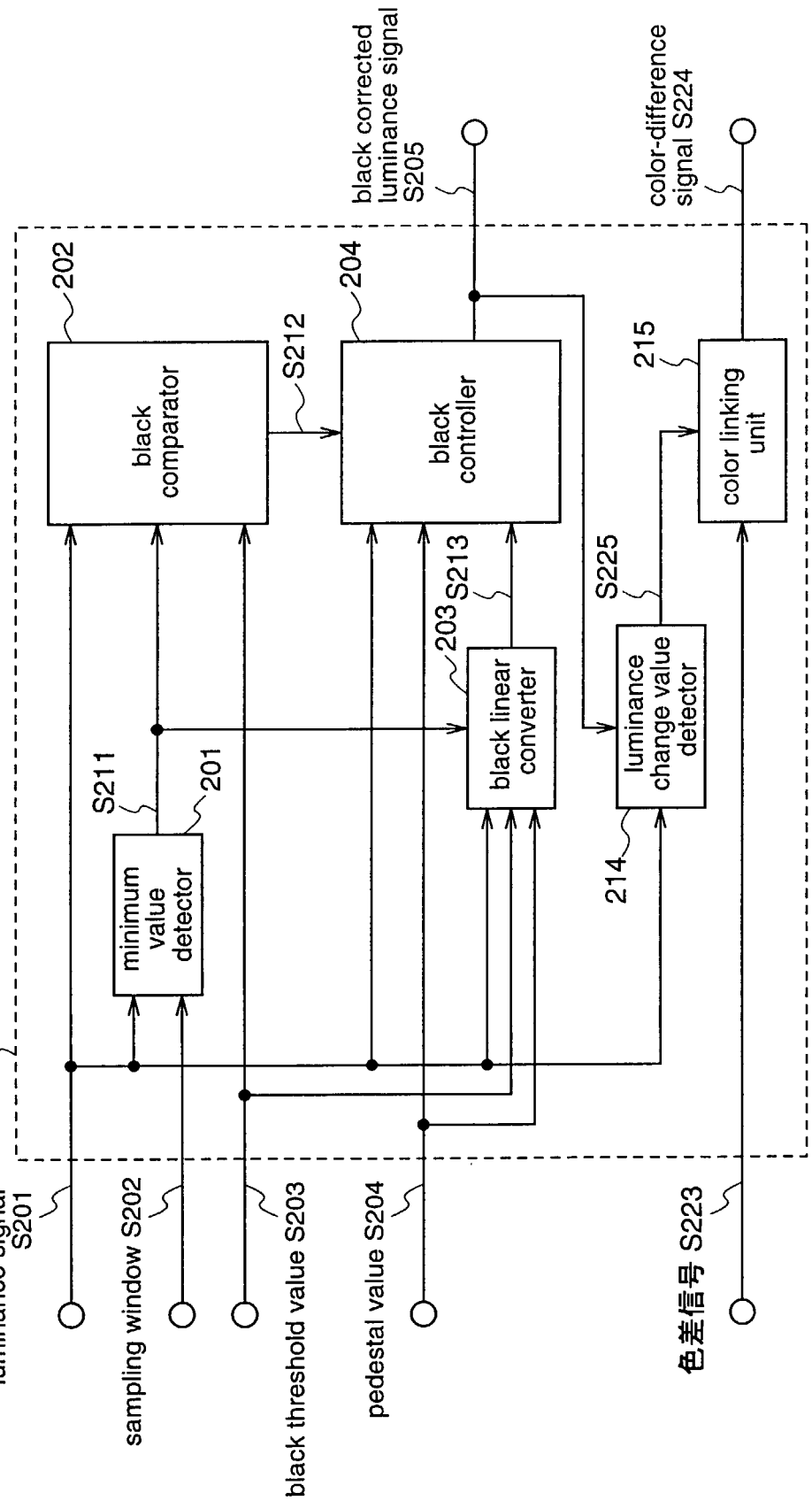
FIG. 21 is a block diagram illustrating the construction of a gradation correcting apparatus according to a seventeenth embodiment of the present invention.

FIG. 21 is a block diagram illustrating the construction of a gradation correcting apparatus according to the seventeenth embodiment.

With reference to FIG. 21, a gradation correcting apparatus 257 is provided with a minimum value detector 201, a black comparator 202, a black linear converter 203, a black controller 204, a luminance change amount detector 214, and a color linking unit 215. The constructions and operations of parts other than parts relating to the luminance change amount detector 214 and the color linking unit 215 are identical to those of the gradation correcting apparatus 250 of the tenth embodiment and, therefore, repeated description is not necessary.

The luminance change amount detector 214 receives the luminance signal S201 and the black corrected luminance signal S205, and obtains a difference between the luminance signal S201 and the black corrected luminance signal S205 to detect an amount of change of the luminance value that is gradation-corrected to the black side, and outputs the amount of change as a luminance change amount S225.

The color linking unit 215 corrects a color-difference signal S223 according to the luminance change amount S225 to take a balance between the color-difference signal S223 and the black corrected luminance signal S205 that is gradation-corrected to the black side.

Next, the operation of the gradation correcting apparatus according to the seventeenth embodiment will be described.

The luminance change amount detector 214 obtains a difference between the luminance signal S201 and the black corrected luminance signal S205, and outputs the difference as a luminance change amount S225 to the color linking unit 215. The color linking unit 215 changes the color-difference signal S223 on the basis of the luminance change amount S225, and outputs a corrected color-difference signal S224. For example, when $\Delta Y$ is inputted as a luminance change amount S225 and R-Y and B-Y are inputted as color-difference signals S223 to the color linking unit 215, the color-difference signals S223 are converted into R-Y-$\Delta Y$ and B-Y-$\Delta Y$ in the color linking unit 215, respectively, and they are outputted as corrected color-difference signals S224. Here, the $\Delta Y$ is a value obtained by subtracting the luminance signal S201 from the black corrected luminance signal S205.

The operation of the gradation correcting apparatus 257 other than the luminance change amount detector 214 and the color linking unit 215 is identical to that described for the tenth embodiment and, therefore, repeated description is not necessary.

As described above, the gradation correcting apparatus according to the seventeenth embodiment is provided with the luminance change amount detector 214 which detects a luminance change amount S225 on the basis of the luminance signal S201 and the black corrected luminance signal S205, and the color linking unit 215 which corrects the color-difference signal S223 on the basis of the luminance change amount S225, and outputs the corrected color-difference signal S224. Therefore, in addition to the same effects as described for the tenth embodiment, the corrected color-difference signal S224 is obtained by correcting the color-difference signal S223.

Conversion to be performed on the color-difference signal S223 by the color linking unit 215 is not restricted to the conversion described for the seventeenth embodiment. Any conversion may be carried out so long as the color-difference signal S223 is appropriately changed according to the luminance change amount S225 that is the amount of change of the luminance signal S201, and the corrected color-difference signal S224 is balanced with the black corrected luminance signal S205.

In the tenth to seventeenth embodiments, the gradation correcting apparatus of the present invention is applicable whether the pedestal value S204 is a fixed value or a variable value.

Furthermore, the respective constituents of the gradation correcting apparatus according to each of the above-mentioned embodiments may be implemented by hardware unique to the apparatus or software by program control.

Moreover, the gradation correcting apparatus may be constructed so as to have both of a gradation correcting unit relating to white correction according to any of the first to ninth embodiment and a gradation correcting unit relating to black correction according to any of the tenth to seventeenth embodiments.

Embodiment 18

Hereinafter, a video display apparatus according to an eighteenth embodiment of the present invention will be described with reference to the drawings.

Figure 22:
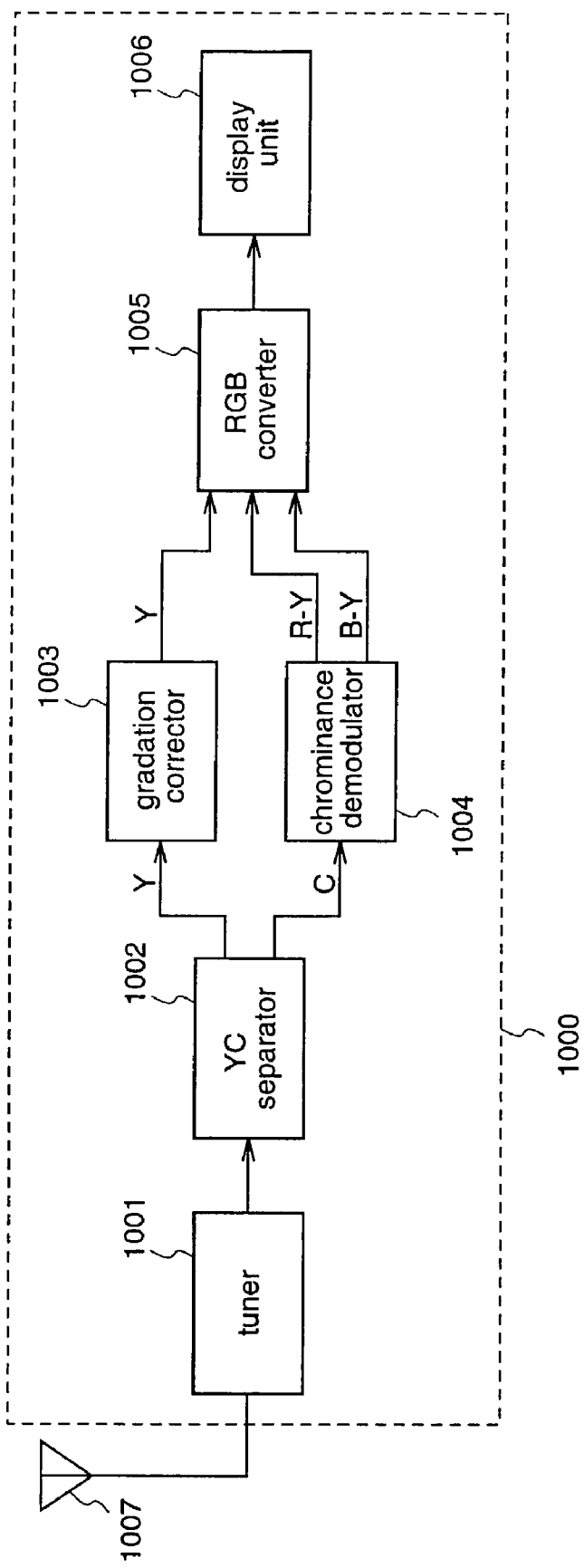
FIG. 22 is a block diagram illustrating the construction of a video display apparatus according to an eighteenth embodiment of the present invention.

FIG. 22 is a block diagram illustrating an example of construction of a video display apparatus according to the eighteenth embodiment.

In FIG. 22, a video display apparatus 1000 is provided with a tuner 1001, a YC separator 1002, a gradation corrector 1003, a chrominance demodulator 1004, an RGB converter 1005, and a display unit 1006.

The tuner 1001 receives a radio wave from an antenna 1007, and outputs a video signal to the YC separator 1002.

The YC separator 1002 separates the video signal from the tuner 1001 into a luminance signal Y and a chrominance signal C, and outputs the luminance signal Y and the chrominance signal C to the gradation corrector 1003 and to the chrominance demodulator 1004, respectively.

As for the gradation corrector 1003, any of the gradation correcting apparatuses according to the first to seventeenth embodiments is employed. Then, the luminance signal Y is subjected to the gradation correction described for any of the above-mentioned embodiments, and the gradation-corrected luminance signal Y is outputted to the RGB converter 1005.

The chrominance decoder 1004 demodulates the chrominance signal C into color-difference signals R-Y and B-Y, and outputs the color-difference signals R-Y and B-Y to the RGB converter 1005.

The RGB converter 1005 converts the luminance signal Y from the gradation corrector 1003 and the color-difference signals R-Y and B-Y from the color demodulator 1004 into RGB signals, and displays a video image on the display unit 1006.

In this way, the gradation-corrected image is displayed on the display unit 1006. As the display unit 1006, for example, an LCD (Liquid Crystal Display), a PDP (Plasma Display Panel), a CRT (Cathode Ray Tube) or the like is employed.

As described above, the video display apparatus according to the eighteenth embodiment is provided with the gradation corrector 1003 for performing gradation correction on the luminance signal Y. Therefore, the video image can be displayed with the dynamic range that is enlarged more appropriately, according to the dynamic range of the display unit 1006.

When any of the gradation correcting apparatuses described for the ninth to seventeenth embodiments is employed, the color-difference signals R-Y and B-Y outputted from the chrominance demodulator 1004 are also inputted to the gradation corrector 1003.

Further, the construction of the video display apparatus shown in FIG. 22 is merely an example, and the video display apparatus of the present invention is not restricted to the construction shown in FIG. 22. Any construction may be employed so long as it can perform gradation correction on a luminance signal.

Furthermore, while the video display apparatus 1000 which receives a radio wave from the antenna 1007 and displays a video image on the display unit 1006 is described in this eighteenth embodiment, the video display apparatus of the present invention is not restricted to one receiving a radio wave. For example, the present invention is also applicable to a video display apparatus having no tuner, receiving a video signal from a PC or the like, and performing gradation correction on a luminance signal Y of the video signal to display a video image on a display unit.

APPLICABILITY IN INDUSTORY

As described above, the gradation correcting apparatus, the gradation correcting method, and the video display apparatus according to the present invention are useful as those for enlarging the dynamic range of a video signal, and are suited to those for performing gradation correction on a luminance signal of an input video signal.

The invention claimed is:

1. A gradation correcting apparatus comprising:
   a maximum value detection means for detecting a maximum value of a luminance signal within a predetermined period of time, and outputting it as a maximum luminance value;
   a comparison means for comparing a first white threshold value, the maximum luminance value, and the luminance signal, and outputting a result of the comparison as a white comparison signal;
   a linear conversion means for receiving the first white threshold value, a second white threshold value, the maximum luminance value, and the luminance signal, and performing a predetermined linear conversion on the luminance signal to output a white linear-converted luminance signal; and
   a control means for selecting one from among the luminance signal, the second white threshold value, and the white linear-converted luminance signal, on the basis of the white comparison signal, and outputting it as a white corrected luminance signal;
   wherein the control means selects the luminance signal when the white comparison signal indicates that the luminance signal is equal to or smaller than the first white threshold value, selects the white linear-converted luminance signal when the white comparison signal indicates that the luminance signal is larger than the first white threshold value and equal to or smaller than the maximum luminance value, and selects the second white threshold value when the white comparison signal indicates that the luminance signal is larger than the first white threshold value and larger than the maximum luminance value.

2. A gradation correcting apparatus as defined in claim 1 further comprising a threshold value change means for changing the first white threshold value on the basis of an average luminance level which is an average of levels of the luminance signal within a predetermined period of time, and outputting it as a changed white threshold value;
   wherein the comparison means and the linear conversion means employ the changed white threshold value instead of the first white threshold value.

3. A gradation correcting apparatus as defined in claim 1 further comprising a threshold value change means for changing the first white threshold value on the basis of the maximum luminance value, and outputting it as a changed white threshold value;
   wherein the comparison means and the linear conversion means employ the changed white threshold value instead of the first white threshold value.

4. A gradation correcting apparatus as defined in claim 1 further comprising:
   a minimum value detection means for detecting a minimum value of the luminance signal within a predetermined period of time, and outputting it as a minimum luminance value; and
   a threshold value generation means for performing a predetermined arithmetic operation on the basis of the maximum luminance value and the minimum luminance value to generate a first white threshold value;
   wherein the comparison means and the linear-conversion means employ the first white threshold value generated by the threshold value generation means.

5. A gradation correcting apparatus as defined in claim 1 further comprising a maximum value change means for changing the maximum luminance value, and outputting it as a changed maximum luminance value;
   wherein the comparison means and the linear-conversion means employ the changed maximum luminance value instead of the maximum luminance value.

6. A gradation correcting apparatus as defined in claim 1 further comprising a maximum value change means for changing the maximum luminance value on the basis of an average luminance level which is an average of levels of the luminance signal within a predetermined period of time, and outputting it as a changed maximum luminance value;
   wherein the comparison means and the linear-conversion means employ the changed maximum luminance value instead of the maximum luminance value.

7. A gradation correcting apparatus as defined in claim 1 further comprising:
   a minimum value detection means for detecting a minimum value of the luminance signal within a predetermined period of time, and outputting it as a minimum luminance value; and
   a threshold value change means for changing the second white threshold value on the basis of the minimum luminance value, and outputting it as a changed white threshold value;
   wherein the linear-conversion means and the control means employ the changed white threshold value instead of the second white threshold value.

8. A gradation correcting apparatus as defined in claim 1 further comprising a microprocessor for changing the maximum luminance value, and outputting it as a changed maximum luminance value;
   wherein the comparison means and the linear conversion means employ the changed maximum luminance value instead of the maximum luminance value.

9. A gradation correcting apparatus as defined in claim 1 further comprising:
   a luminance change amount detection means for detecting the amount of change from the luminance value of the luminance signal to the luminance value of the white corrected luminance signal, and outputting it as a luminance change amount; and
   a color linking means for correcting a color-difference signal on the basis of the luminance change amount.

10. A gradation correcting apparatus comprising:
   a minimum value detection means for detecting a minimum value of a luminance signal within a predetermined period of time, and outputting it as a minimum luminance value;
   a comparison means for comparing a black threshold value, the minimum luminance value, and the luminance signal, and outputting a result of the comparison as a black comparison signal;
   a linear conversion means for receiving the black threshold value, a pedestal value, the minimum luminance value, and the luminance signal, and performing a predetermined linear conversion on the luminance signal to output a black linear-converted luminance signal; and a control means for selecting one from among the luminance signal, the pedestal value, and the black linear-converted luminance signal, and outputting it as a black corrected luminance signal;

wherein the control means selects the luminance signal when the black comparison signal indicates that the luminance signal is equal to or larger than the black threshold value, selects the black linear-converted luminance signal when the black comparison signal indicates that the luminance signal is smaller than the black threshold value and equal to or larger than the minimum luminance value, and selects the pedestal value when the black comparison signal indicates that the luminance signal is smaller than the black threshold value and smaller than the minimum luminance value.

11. A gradation correcting apparatus as defined in claim 10 further comprising a threshold value change means for changing the black threshold value on the basis of an average luminance level which is an average of levels of the luminance signal within a predetermined period of time, and outputting it as a changed black threshold value;

wherein the comparison means and the linear conversion means employ the changed black threshold value instead of the black threshold value.

12. A gradation correcting apparatus as defined in claim 10 further comprising a threshold value change means for changing the black threshold value on the basis of the minimum luminance value, and outputting it as a changed black threshold value;

wherein the comparison means and the linear conversion means employ the changed black threshold value instead of the black threshold value.

13. A gradation correcting apparatus as defined in claim 10 further comprising:

a maximum value detection means for detecting a maximum value of the luminance signal within a predetermined period of time, and outputting it as a maximum luminance value; and a threshold value generation means for performing a predetermined arithmetic operation on the basis of the minimum luminance value and the maximum luminance value to generate a black threshold value;

wherein the comparison means and the linear conversion means employ the black threshold value generated by the threshold value generation means.

14. A gradation correcting apparatus as defined in claim 10 further comprising a minimum value change means for changing the minimum luminance value, and outputting it as a changed minimum luminance value;

wherein the comparison means and the linear conversion means employ the changed minimum luminance value instead of the minimum luminance value.

15. A gradation correcting apparatus as defined in claim 10 further comprising a minimum value change means for changing the minimum luminance value on the basis of an average luminance level which is an average of levels of the luminance signal within a predetermined period of time, and outputting it as a changed minimum luminance value;

wherein the comparison means and the linear conversion means employ the changed minimum luminance value instead of the minimum luminance value.

16. A gradation correcting apparatus as defined in claim 10 further comprising a microprocessor for changing the minimum luminance value, and outputting it as a changed minimum luminance value;

wherein the comparison means and the linear conversion means employ the changed minimum luminance value instead of the minimum luminance value.

17. A gradation correcting apparatus as defined in claim 10 further comprising:

a luminance change amount detection means for detecting the amount of change from the luminance value of the luminance signal to the luminance value of the black corrected luminance signal, and outputting it as a luminance change value; and a color linking means for correcting a color-difference signal on the basis of the luminance change amount.

18. A gradation correcting method comprising:

a maximum value detection step of detecting a maximum value of a luminance signal within a predetermined period of time;

a linear conversion step of receiving the first white threshold value, a second white threshold value, the maximum luminance value, and the luminance signal, and performing a predetermined linear conversion on the luminance signal;

a comparison step of comparing a maximum luminance value that is the maximum value detected in the maximum value detection step, the first white threshold value, and the luminance signal; and a selection step of selecting one from among a linear-converted luminance signal that is obtained by linear-converting the luminance signal in the linear conversion step, the luminance signal, and the second white threshold value, as a white corrected luminance signal, on the basis of a result of comparison in the comparison step;

wherein, in the selection step, the luminance signal is selected when the result of comparison in the comparison step indicates that the luminance signal is equal to or smaller than the first white threshold value, the linear-converted luminance signal is selected when the result of comparison in the comparison step indicates that the luminance signal is larger than the first white threshold value and equal to or smaller than the maximum luminance value, and the second white threshold value is selected when the result of comparison in the comparison step indicates that the luminance signal is larger than the first white threshold value and larger than the maximum luminance value.

19. A gradation correcting method comprising:

a minimum value detection step of detecting a minimum value of a luminance signal within a predetermined period of time;

a linear conversion step of receiving a black threshold value, a pedestal value, the minimum luminance value, and the luminance value, and performing a predetermined linear conversion on the luminance signal;

a comparison step of comparing the black threshold value, a minimum luminance value that is the minimum value detected in the minimum value detection step, and the luminance signal; and a selection step of selecting one from among a linear-converted luminance signal that is obtained by linear-converting the luminance signal in the linear conversion step, the luminance signal, and the pedestal value, as a black corrected luminance signal, on the basis of a result of comparison in the comparison step;

wherein, in the selection step, the luminance signal is selected when the result of comparison in the comparison step indicates that the luminance signal is equal to or smaller than the black threshold value, the linear-converted luminance signal is selected when the result of comparison in the comparison step indicates that the luminance signal is smaller than the black threshold value and equal to or larger than the minimum luminance value, and the pedestal value is selected when the result of comparison in the comparison step indicates that the luminance signal is smaller than the black threshold value and smaller than the minimum luminance value.

20. A video display apparatus having a gradation correcting apparatus defined in claim 1.

* * * * *

UNITED STATES PATENT AND TRADEMARK OFFICE
CERTIFICATE OF CORRECTION

| | | |
|---|---|---|
| PATENT NO. | : 7,113,227 B1 | Page 1 of 1 |
| APPLICATION NO. | : 10/129541 | |
| DATED | : September 26, 2006 | |
| INVENTOR(S) | : Yuki Kakuya et al. | |

It is certified that error appears in the above-identified patent and that said Letters Patent is hereby corrected as shown below:

On The Title Page, Item -56-
Page 2 of the title page, under FOREIGN PATENT DOCUMENTS, the second listed document should read:

-- JP    5-167912    7/1993 --.

Signed and Sealed this

Seventh Day of August, 2007

JON W. DUDAS
*Director of the United States Patent and Trademark Office*